(12) United States Patent
Lurie

(10) Patent No.: US 9,375,646 B2
(45) Date of Patent: Jun. 28, 2016

(54) WIND TUNNEL DESIGN WITH EXPANDING CORNERS

(71) Applicant: Airborne America, Inc., Coronado, CA (US)

(72) Inventor: Marc Lurie, Lafayette, CA (US)

(73) Assignee: Airborne America, Inc., Coronado, CA (US)

( * ) Notice: Subject to any disclaimer, the term of this patent is extended or adjusted under 35 U.S.C. 154(b) by 0 days.

(21) Appl. No.: 14/938,558

(22) Filed: Nov. 11, 2015

(65) Prior Publication Data

US 2016/0059139 A1    Mar. 3, 2016

Related U.S. Application Data

(63) Continuation of application No. 14/698,064, filed on Apr. 28, 2015, now Pat. No. 9,327,202.

(60) Provisional application No. 62/018,778, filed on Jun. 30, 2014, provisional application No. 62/081,251, filed on Nov. 18, 2014.

(51) Int. Cl.
*A63G 31/00* (2006.01)
*B64D 23/00* (2006.01)
*G09B 9/00* (2006.01)

(52) U.S. Cl.
CPC .............. *A63G 31/00* (2013.01); *B64D 23/00* (2013.01); *G09B 9/00* (2013.01); *A63G 2031/005* (2013.01)

(58) Field of Classification Search
CPC .............. A63J 5/00; A63J 5/12; A63G 31/00; A63G 31/12; A63G 31/16; A63G 2031/002
USPC .......... 472/50, 68, 130, 137; 73/147; 434/247
See application file for complete search history.

(56) References Cited

U.S. PATENT DOCUMENTS

| | | | |
|---|---|---|---|
| 3,484,953 | A | 12/1969 | Norheim, Jr. |
| 4,700,565 | A | 10/1987 | Albuschkat |
| 5,405,106 | A | 4/1995 | Chintamani et al. |
| 5,435,175 | A | 7/1995 | Kramer et al. |
| 5,655,909 | A | 8/1997 | Kitchen et al. |
| 6,644,355 | B1 | 11/2003 | Gleason |
| 7,028,542 | B2 | 4/2006 | Metni |
| 7,156,744 | B2 | 1/2007 | Metni et al. |
| RE43,028 | E | 12/2011 | Kitchen et al. |

(Continued)

FOREIGN PATENT DOCUMENTS

| | | |
|---|---|---|
| DE | 19822713 | 11/1999 |
| JP | H10311774 | 11/1998 |

OTHER PUBLICATIONS

Bell, Hames H.; et al.; Boundary-Layer Predictions for Small Low-Speed Contractions; AIAA Journal, vol. 27, No. 3, Mar. 1989, pp. 372-374.

(Continued)

*Primary Examiner* — Kien Nguyen
(74) *Attorney, Agent, or Firm* — Michael Stanley Tomsa; McAndrews, Held & Malloy, Ltd.

(57) ABSTRACT

A wind tunnel may comprise: a flight chamber; a plurality of diffusers; a plurality of expanding corners, wherein the plurality of expanding corners comprises a first expanding corner and a second expanding corner; and a return, the return configured to have disposed therein a fan operatively coupled with a motor.

25 Claims, 13 Drawing Sheets

(56) References Cited

U.S. PATENT DOCUMENTS

| | | |
|---|---|---|
| 8,141,588 B2 | 3/2012 | Tan et al. |
| 2009/0158835 A1 | 6/2009 | Serrano Pellicer |
| 2011/0165545 A1 | 7/2011 | Nebe et al. |
| 2012/0312502 A1 | 12/2012 | Metni et al. |

OTHER PUBLICATIONS

Brandstatt, P.; et al.; Novel Silencers and Absorbers for Wind Tunnels and Acoustic Test Cells.

Cattafesta, Louis; et al.; Fundamentals of Wind-Tunnel Design, Encyclopedia of Aerospace Engineering., Edited by Richard Blockley and Wei Shyy, 2010 John Wiley & Sons, Ltd.

Chamorro, Leonardo P.; et al.; Turbulent Flow Inside and Above a Wind Farm: A Wind-Tunnel Study; Energies 2011, 4, pp. 1916-1936.

Gonzalez Hernandez, Mmiguel A.; et al.; Design Methodology for a Quick and Low-Cost Wind Tunnel; Wind Tunnel Designs and Their Diverse Engineering Applications, http://dx.doi.org/10.5772/54169 (2013).

Lindgren, Bjorn; et al.; Design and Evaluation of a Low-Speed Wind-Tunnel with Expanding Corners, Technical Reports from Royal Institute of Technology, Department of Mechanics SE-100 44 Stockholm, Sweden, Oct. 2002.

Mehta, R. D.; et al.; Design rules for small low speed wind tunnels; Aero. Journal (Royal Aeronautical Society), Nov. 1979, pp. 443-449.

Mehta, R. D.; Turbulent Boundary Layer Perturbed by a Screen; AIAA Journal; vol. 23, No. 9, Sep. 1985; pp. 1335-1342.

Rennie, Dr. Mark; Effect of Jet Length on Pressure Fluctuations in ¾ Open-Jet Wind Tunnels.

Soderman, Paul T.; Sources and Levels of Background Noise in the NASA Ames 40- by 80-Foot Wind Tunnel—A Status Report, NASA Technical Memorandum 100077, May 1988.

Tanida, Hiroyuk;i et al.; Effects of Turbulence on Aerodynamic Noise Generation of Rearview Mirrors.

Wind Tunnel Design, 3.2 Basic Decisions, pp. 61-135.

Yao, Jinbo; et al.; Low-speed wind tunnel testing control systems research; Proceedings of the 2nd International Conference on Computer Science and Electronics Engineering (ICCSEE 2013), pp. 1371-1373.

International Search Report and Written Opinion for PCT/US2015/037682 mailed Oct. 13, 2015.

Undated and Untitled Drawing of a Wind Tunnel.

Collar, A. R.; Some Experiments with Cascades of Aerofoils; Reports and Memoranda No. 1768, Dec. 1936.

Frieman, Daniel et al.; Experimental Investigation of a 90° Cascade Diffusing Bend with an Area Ratio of 1.45:1 and with Several Inlet Boundary Layers; NACA TN 2668; Apr. 1952.

Goodrich, Malinda et al.; Wind Tunnels of the Eastern Hemisphere; A Report Prepared by the Federal Research Division, Library of Congress for the Aeronautics Research Mission Directorate, NASA; Aug. 2008.

Hunt, Lauren E. et al.; Flow Quality Measurements in the Klebanoff-Saric Wind Tunnel; 27th AIAA Aerodynamic Measurement Technology and Ground Testing Conference; Jun. 28-Jul. 1, 2010.

Idel'chik, I.E., Handbook of Hydraulic Resistance; 1960.

Koss, Holger; Climateic Wind Tunnel, Civil Engineering & Architectural Aerodynamics; May 2014.

Lindgren, Björn et al.; Evaluation of a New Wind-Tunnel with Expanding Corners; Royal Institute of Technology Department of Mechanics SE-100 44 Stockholm, Sweden; Oct. 2003.

WIND TUNNEL DESIGN WITH EXPANDING CORNERS

CROSS REFERENCE TO RELATED APPLICATIONS

This application is a continuation of and claims priority to U.S. application Ser. No. 14/698,064, filed on Apr. 28, 2015, entitled Improved Wind Tunnel Design With Expanding Corners, which claims priority to U.S. Provisional Patent Application Nos. 62/018,778, filed on Jun. 30, 2014 and entitled "Vertical Wind Tunnel;" and 62/081,251, filed on Nov. 18, 2014 and entitled "Improved Wind Tunnel Design With Expanding Corners." Each application is hereby incorporated by reference in its entirety.

TECHNICAL FIELD

The present invention relates to the field of wind tunnels; more particularly, to wind tunnels having an improved performance, reduced footprint, and lower cost of construction and operation.

BACKGROUND

Wind tunnels are available in many types and styles depending upon the needs of the user. These include, without limitation, subsonic wind tunnels with and without return flow, transonic wind tunnels with and without return flow, vertical subsonic wind tunnels with and without return flow, supersonic and hypersonic wind tunnels with and without return flow, and compressible flow wind tunnels.

Wind tunnels may be used in the testing of conventional aircraft, helicopters, parachutes, and other aerodynamic devices, wing surfaces, control surfaces, submarines, rockets, and other launch vehicles, ground vehicles such as automobiles and trucks, buildings, other basic flow investigations, and, more recently, amusement (i.e., recreational use). The wind tunnel state of the art may be gleaned from the following patents and patent applications.

U.S. Pat. No. RE43,028 E1 is directed to a vertical wind tunnel amusement device. U.S. Pat. No. 5,655,909 is directed to a skydiving simulator combining a vertical air chamber with a video projection system on the interior wall. U.S. Pat. No. 7,028,542 is directed to a reduced drag cable for use in vertical wind tunnels and other applications with a change in the spacing and/or size of the strands of a standard twisted wire cable. U.S. Pat. No. 7,156,744 is directed to a vertical wind tunnel flight simulator comprising a flight chamber wherein a flyer may experience a freefall simulation. U.S. Pat. No. 2012/0312502 is directed to a cooling system for a wind tunnel.

Despite the prior attempts, a need exists for a more efficient, compact, economical wind tunnel, more specifically; a need exists for a more efficient, compact, economical vertical wind tunnel. The present invention facilitates the creation of such wind tunnels.

SUMMARY OF THE INVENTION

The present invention is directed to a more efficient, compact, economical vertical wind tunnel and, in certain aspects, a horizontal wind tunnel.

According to a first aspect, a vertical wind tunnel comprises: a flight chamber; a plurality of diffusers; a plurality of expanding corners, wherein the plurality of expanding corners comprises a first expanding corner and a second expanding corner; and a return, the return configured to have disposed therein a fan operatively coupled with a motor.

In certain aspects, the vertical wind tunnel may further comprise a second return.

In certain aspects, the plurality of expanding corners further comprises a third expanding corner and a fourth expanding corner.

In certain aspects, the flight chamber has a circular cross section and a substantially constant area along the flight chamber's length.

In certain aspects, the expansion ratio of the first expanding corner is not equal to the expansion ratio of the second expanding corner.

In certain aspects, the mean average expansion ratio of the third expanding corner and the fourth expanding corner is greater than the mean average expansion ratio of the first expanding corner and the second expanding corner.

In certain aspects, at least one of said plurality of diffusers or said one or more expanding corners (1) is fabricated using a mold resistant material; or (2) employs mold-resistant sealant.

In certain aspects, each of said plurality of expanding corners has an expansion ratio of between about 1.01 to about 3.00.

In certain aspects, the expansion ratio of at least one of said plurality of expanding corners is between 1.10 and 1.50.

In certain aspects, the plurality of diffusers comprises a first diffuser having a circle to quadrilateral transition.

In certain aspects, the plurality of diffusers further comprises a second diffuser positioned between said first expanding corner and said second expanding corner.

In certain aspects, the return is positioned between the second expanding corner and the third expanding corner.

In certain aspects, the return transitions (1) from a first quadrilateral cross section to a circular cross section, and (2) from the circular cross section to a second quadrilateral cross section.

In certain aspects, the return transitions from a first quadrilateral cross section to a second quadrilateral cross section.

In certain aspects, air traveling through the vertical wind tunnel is cooled using a water cooling technique whereby water is brought into intimated contact with an exterior wall of said vertical wind tunnel.

In certain aspects, the vertical wind tunnel further comprises a contraction nozzle disposed between said fourth expanding corner and said flight chamber, wherein the contraction nozzle transitions from a quadrilateral cross section to a round cross section.

In certain aspects, at least one of said plurality of diffusers utilizes a conical-angle expansion between 0.1 and 7.0 degrees.

In certain aspects, at least one of said plurality of expanding corners comprises a plurality of internally-cooled internal turning vanes.

In certain aspects, said internally-cooled internal turning vanes cooled via a ground-coupled heat exchanger.

In certain aspects, said first quadrilateral cross section is rotated 90 degrees relative to said second quadrilateral cross section.

In certain aspects, the vertical wind tunnel further comprises a netting device positioned at an upstream end of said flight chamber, the netting device being coupled to a net frame via at least one cable, each of said at least one cable having a first distal end and a second distal end, wherein a head end unit is coupled to the first distal end and a receiving end unit is coupled to the second distal end, wherein the head end unit couples the first distal end to a first connection point on said net frame and comprises a first compression spring and a tensioning bolt that is adjustable in length, and wherein the receiving end unit couples the second distal end to a second connection point on said net frame and comprises a second compression spring.

According to a second aspect, a wind tunnel comprises: a chamber; a plurality of diffusers; a plurality of expanding corners, wherein the plurality of expanding corners comprises a first expanding corner and a second expanding corner, wherein each of said plurality of expanding corners has an expansion ratio of between about 1.01 to about 3.00; and a return, the return configured to have disposed therein a fan operatively coupled with a motor.

In certain aspects, the plurality of expanding corners further comprises a third expanding corner and a fourth expanding corner.

In certain aspects, the expansion ratio of the first expanding corner is not equal to the expansion ratio of the second expanding corner.

In certain aspects, the expansion ratio of at least one of said plurality of expanding corners is between 1.10 and 1.50.

DESCRIPTION OF THE DRAWINGS

These and other advantages of the present invention will be readily understood with the reference to the following specifications and attached drawings wherein:

FIG. 1b is a cut-away view of the vertical wind tunnel of FIG. 1a;

FIG. 2c is a cut-away view of the vertical wind tunnel of FIG. 2a;

FIG. 3b is a cut-away view of the vertical wind tunnel of FIG. 3a;

FIG. 4b is a cut-away view of the vertical wind tunnel of FIG. 4a;

DETAILED DESCRIPTION

Figure 1A:
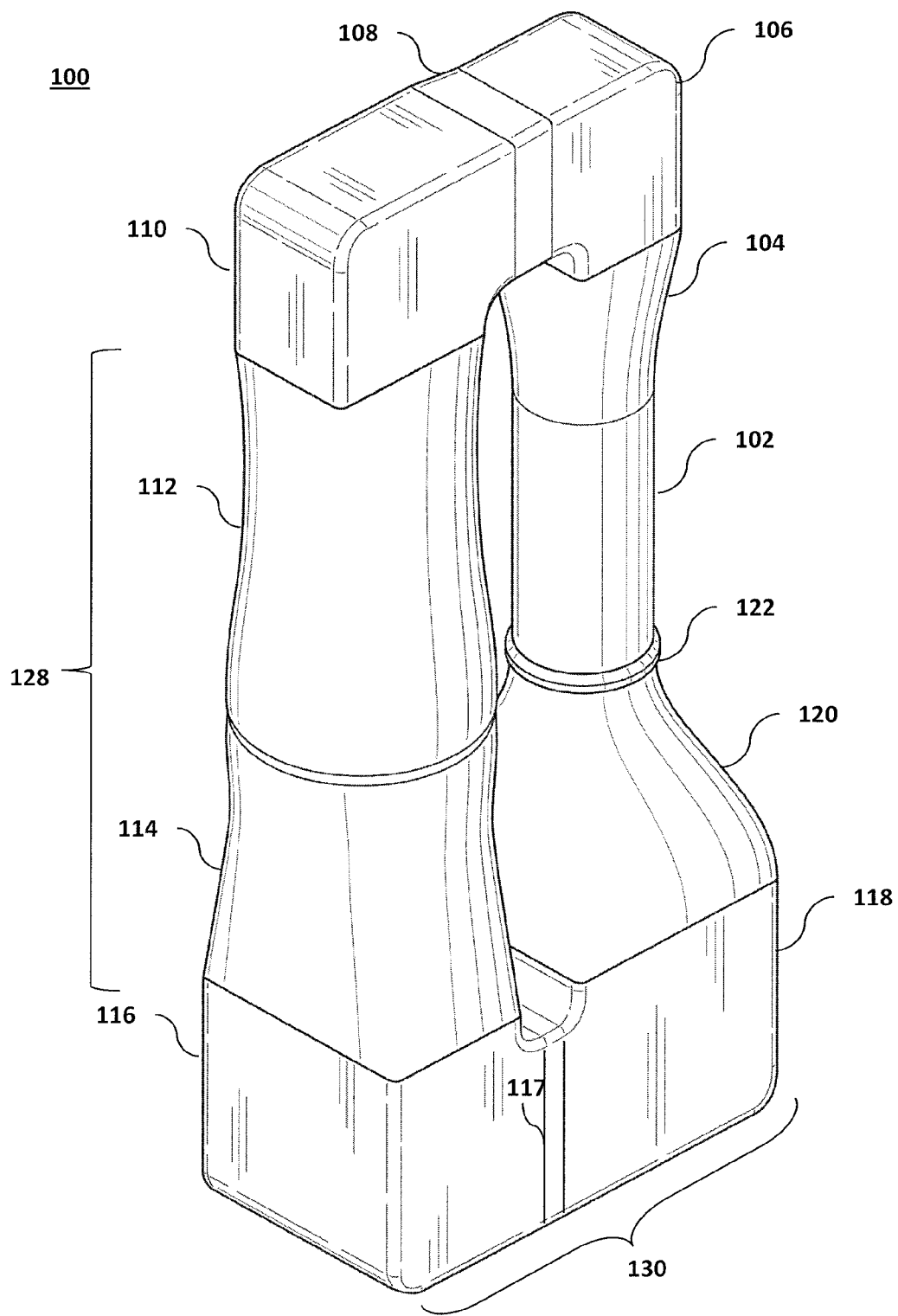
FIG. 1a is a perspective view of an exemplary embodiment of a vertical wind tunnel.

Preferred embodiments of the present invention will be described hereinbelow with reference to the accompanying drawings. In the following description, well-known functions or constructions are not described in detail because they may obscure the invention in unnecessary detail. The present invention discloses a more efficient, compact, and economical wind tunnel. While the present invention is generally described as a vertical wind tunnel being intended for indoor skydiving applications, the teachings may be applied to wind tunnels employed for other purposes and therefore should not be limited to those intended for indoor skydiving applications. For this disclosure, the following terms and definitions shall apply:

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations, which, unless otherwise indicated, should not exceed a ten percent deviation. Further, the values and ranges of values recited herein describe one embodiment, but other values and ranges of values may be employed to produce a desired wind tunnel for a particular purpose. For example, a person of skill of ordinary skill in the art could adapt the present teachings to construct flight chambers of sizes other than those disclosed. Thus, a person of skill of ordinary skill in the art, upon review of the subject specification, would understand how to apply the subject teachings and determine workable values and ranges of values based upon the values and ranges of values disclosed herein.

As will be appreciated from the following description, the vertical wind tunnel disclosed herein provides a number of improvements relating to customer experience, cost of construction, and cost of operation. First, with regard to customer experience, the present vertical wind tunnel's novel design allows for the flight chamber 102 to be positioned at the ground floor, thereby enabling easier access for customers. Further, the novel design, as discussed below, produces a better, more laminar (i.e., less turbulent) airflow, which yields a smoother and safer flight experience for customers. The novel design also permits faster wind speeds at nominal power levels, thereby enabling enthusiasts to fly at speeds well above that of free fall. Not only is the present vertical wind tunnel superior in terms of at least customer experience, but both the cost of construction and operations are also reduced, thereby reducing both upfront and ongoing costs. For example, the vertical wind tunnel of the present invention employs about one-third of the land of a comparable, traditional vertical wind tunnel, thus reducing real estate cost.

Within its smaller real-estate footprint, such vertical wind tunnels may be accomplished with a smaller facility, while providing the same approximate size flight chamber 102 of a much larger facility, thus requiring fewer materials, lower cost of construction, and faster construction for the physical structure. Yet another benefit is that a smaller structure size results in a larger array of potential installation locations, thereby enabling installation of the vertical wind tunnel in crowded places, such as downtown urban areas and other entertainment zones with particularly dense foot traffic.

The cost of operation is mitigated because the vertical wind tunnel need only move a much smaller volume of air than other facilities having flight chambers of the same approximate size, which results in a lower energy expenditure. Moreover, the airflow is designed to travel with greater efficiency, which reduces pressure loss and energy expenditure. Finally, because there are fewer parts to wear or break, the present vertical wind tunnel has a higher mean time between failures ("MTBF") than traditional vertical wind tunnels, such as multiple-motor systems.

With reference to the Figures, an exemplary embodiment of the vertical wind tunnel 100 is illustrated having: a flight chamber 102, a plurality of diffusers 104, 108, 112, 114, (and, in some embodiments, a fifth diffuser 117), one or more breather slots 122, a fan 202 operatively coupled with a motor, and a plurality of expanding corners 106, 110, 116, 118. The one or more breather slots 122 may comprise just one slot, or a plurality of slots, which may be arranged horizontally, vertically, or a combination thereof. The plurality of diffusers 104, 108, 112, 114 and the plurality of expanding corners 106, 110, 116, 118 are arranged and configured such that they are in closed-loop flow communication with one another (see FIGS. 1b and 2c, where airflow direction is indicated as airflow direction F). More specifically, the vertical wind tunnel 100's design is an "open jet" tunnel, which means that the air pressure is equalized with the environment outside the tunnel; thereby obviating the need for pressure locks between the inner tunnel area and external atmosphere. While the subject disclosure is primarily described as applied to a vertical wind tunnel used for recreational purposes, the various novel teachings may be applied to other wind tunnels, including, without limitation, horizontal wind tunnels, such as those utilized for industrial, scientific, and sport testing. To that end, while the term flight chamber throughout this disclosure, when the wind tunnel is configured as a non-flying tunnel (e.g., a wind tunnel utilized for industrial, scientific, and sport testing, whether vertical or horizontal), the flight chamber 102 would, in those instances, be better described as a test chamber.

As illustrated, the vertical wind tunnel 100 is arranged to occupy a smaller footprint when the various components are arranged such that the vertical wind tunnel is taller, and less wide. Specifically, an example closed circuit vertical wind tunnel 100 may include: (1) a flight chamber 102 with, for example, a circular cross section; (2) a first diffuser 104 that is also a circle-to-quadrilateral (e.g., a square, as illustrated) transition; (3) four sets of internal turning vanes 208 designed as expanding corners (e.g., first expanding corner 106, second expanding corner 110, third expanding corner 116, and fourth expanding corner 118); (4) a second diffuser 108 positioned between first expanding corner 106 and second expanding corner 110; (5) a return tower 128 between the second expanding corner 110 and the third expanding corner 116 that also transitions from a rectangular cross section to a circular cross section via a third diffuser 112 for the power station 200 and again from a circular cross section to a rectangular cross section via a fourth diffuser 114 before a third expanding corner 116; (6) a single fan 202; a fifth diffuser 117 optionally positioned between the third expanding corner 116 and a fourth expanding corner 118; and (7) a contraction nozzle 120 that also transitions from a quadrilateral (e.g., a square, as illustrated) cross section to the flight chamber 102's round cross section. The vertical wind tunnel 100 may further comprise a fan nacelle 206 and a cone 210. Moreover, a single netting device (e.g., a screen) and breather slots 122 may be positioned at the base of the flight chamber 102.

The various components will now be discussed in greater detail in an order following the airflow direction F, starting with the flight chamber 102. As illustrated, the flight chamber 102 may be a cylinder having a predetermined diameter and a predetermined axial length, with a circular cross-section and substantially constant area along the length of the cylindrical walls. In certain aspects, however, the flight chamber 102 may diffuse, which would mitigate formation of a bottleneck at the downstream end of the flight chamber 102 by counterbalancing, either wholly or in part, the growth of the boundary layer along the walls. The foregoing aspect may, moreover, be particular useful in horizontal tunnels where the "flight chamber" 102 is instead a test chamber and a more constant rate of airflow along the length of the test chamber is desirous for the test conditions. Further, the cross-section of the flight chamber may be polygonal, which, although less ideal from an airflow perspective, does permit for lower cost materials to be used for wall fabrication. In yet other embodiments, the cross-section of the flight chamber may be oval, which, although less ideal from an airflow and customer-experience perspective, would allow for an even smaller physical facility to be built while nominally preserving for customers the "feel" of a bigger tunnel, at least along the longer axis of the oval flight chamber. Thus, while the flight chamber 102 is illustrated and described as being round and cylindrical, other shapes are possible, including, for example, oval or polygonal.

With reference to a vertical wind tunnel 100 used for recreational skydiving purposes, the predetermined diameter of the flight chamber 102 may be, for example, 1 to 40 feet, more preferably 7 to 24 feet, and most preferably about 14 feet in diameter. The predetermined axial length of the flight chamber 102 may be, for example, 5 to 75 feet, more preferably 25 to 35 feet, and most preferably about 30 feet in length. However, shorter lengths are possible for non-skydiving tunnels and, therefore, the length could be as short as 1 foot. Conversely, longer lengths are contemplated for certain testing wind tunnels where larger test objects must reside within the flight (test) chamber 102. A base may be situated at the bottom (upstream) end of the flight chamber 102, which may comprise a breather slot 122, and a netting device (e.g., a screen—not shown). Unless indicated otherwise, the various geometry measurements disclosed herein (e.g., diameters, dimension, etc.) are interior dimensions.

The netting device may comprise a porous baffle that functions as the floor for the users (e.g., flyers 124 and instructor 126). The porous baffle operates to reduce turbulence of the flow through the screen. In the case of a non-skydiving wind tunnel, the netting device also serves as a debris catcher, providing a "last chance" to catch objects that might otherwise damage a model located in the test chamber. In other embodiments, one or more breather slots 122 may be located downstream from the end of the flight chamber 102, such as in perforations along the walls of the flight chamber 102, at the entrance, exit, or along the walls of the first diffuser 104, or at the entrance of the first corner 106.

The entire length of the flight chamber 102 may be substantially transparent (e.g., a clear tube/cylinder), and constructed of transparent Plexiglas®, acrylic plastic, glass, or similar high-strength, transparent material. Thus, in certain embodiments, one or more of the walls of the flight chamber 102 may be fabricated entirely (other than mounting hardware, for example) from a transparent material, whether flat or curved transparent panels, and constructed of any of the aforementioned materials. When present, the transparent panels in the flight chamber 102 permit an unrestricted view of the activities taking place therein. Adjacent to the flight chamber 102 may be a loading area (not shown), which communicates with the flight chamber 102 via one or more openings through which one or more users (or test objects) may enter and exit the flight chamber 102. Thus, the loading area and flight chamber 102 may be transparent, or have transparent windows, so that an observer may view the movement of flyers 124 (or test objects) within the flight chamber 102, without having to enter the loading area. When the wind tunnel is configured as a non-skydiving tunnel (or where visual inspection of the flier or test object is not necessary), the loading area and/or flight chamber 102 may be constructed from an opaque material.

In some embodiments, the opening between the loading area and the flight chamber 102 represents the point of lowest pressure in the circuit for the flow of air throughout the length of the wind tunnel. As such, instead of a pressurized air lock, the loading area communicates aerodynamically with the outside environment, which facilitate door-less operation. That is, obviating the need for pressure locks between the inner tunnel (e.g., the flight chamber) and external atmosphere (e.g., the loading area), which, allows users to enter or exit the loading area without first passing through a pressurized-air lock. Alternatively, for purposes of line management—i.e., managing the flow of customers—the loading area may have doors that open periodically to allow people to exit the entire system. Finally, the fan 202 and other controls can be operated from inside the loading area, inside the flight chamber 102, or from an attached or remotely situated control room. The fan 202 may be controlled to achieve the optimum airflow velocity through the flight chamber 102.

As illustrate, a first diffuser 104 can be coupled to the downstream end of the flight chamber 102. The first diffuser 104 may transition from a circular cross-section shape to a quadrilateral cross-section shape so as to facilitate a connection with a first expanding corner 106. The first diffuser 104 may implement an equivalent conical angle between a value greater than zero degrees (e.g., 0.001 and greater) and 10.0 degrees, more preferably between 1.0 and 7.0 degrees, most preferably between 2.0 and 4.0 degrees. To facilitate the transition from a circle to quadrilateral, the first diffuser 104 may employ a cubic-spline transition geometry, as illustrated in FIGS. 7*a* to 7*d*. The cubic-spline profile is advantageous over simple lofting because a cubic-spline profile improves pressure recovery and flow uniformity. Thus, the area change along the length of the first diffuser 104 may follow the cubic-spline profile.

With reference to a vertical wind tunnel 100 used for recreational skydiving purposes having a 14-foot circular flight chamber 102 with a constant diameter, the length of the first diffuser 104 may be between, for example, 5 and 35 feet, more preferably 10 and 25 feet, and most preferably about 15 and 20 feet. That is, testing indicates that a 15-foot length was very good, but a 20-foot length was nearly ideal. The dimension of the first diffuser 104's quadrilateral end may be, for example, about 14 feet by about 14 feet (e.g., 13 to 15 feet, more specifically, 14 to 14.5 feet, even more specifically 14.25 feet). To the extent necessary, and in view of the present teachings, one of ordinary skill in the art would know to adjust the values and ranges of values of these dimensions to correspond with flight chambers of a desired size and shape. In certain embodiments, fillets may be inserted into the corners of the first diffuser 104 in order to reduce the introduction of non-uniformities into the airflow at the point of intersection between the four walls of the first diffuser 104.

The first expanding corner 106 may be an expanding corner with an expansion ratio of about 1.01 to 10.00, more preferably about 1.01 to 7.00, even more preferably about 1.10 to 1.50, or about 1.31, and most preferably about 1.25. Generally speaking, an expanding corner functions by increasing the cross section of the tunnel so as to expand the flow of air. Thus, for example, if the first expanding corner 106 has a 1.25 expansion ratio, the input cross-sectional area would be X, the output cross-sectional area would be 1.25(X). Though larger ratios may be used and can result in a smaller structure that requires less real estate and saves on construction costs, the smaller size has the risk of adversely affecting flow quality through the introduction of non-uniformities, particularly in the high-speed first expanding corner 106. In certain embodiments, however, it may be desirous to sacrifice flow quality in exchange for a shorter return circuit. In such embodiments, the ratio of expansion for the first expanding corner 106 may be increased. To compensate for the resulting introduction of non-uniformities into the airflow, the airflow may be treated downstream of the first expanding corner 106, such as by passing the airflow through a flow straightener composed of hexagonal comb and placed before (e.g., immediately before) the contraction nozzle 120, in an example. A smaller ratio, however, is advantageous in that the resulting slight increase in the overall size of the airflow circuit (versus higher ratios) may reduce risk of introducing non-uniformities into the airflow.

The first expanding corner 106 may have a first quadrilateral end configured to couple with the quadrilateral end of the first diffuser 104, and a second quadrilateral (e.g., rectangular) end configured to couple with the rectangular end of the second diffuser 108.

A second diffuser 108 may provide an expansion in a horizontal axis only and couples the rectangular end of said first expanding corner 106 with a second expanding corner 110's rectangular entrance end. The second diffuser 108 may implement an equivalent conical angle between 0.1 and 10.0 degrees, more preferably between 1.0 and 7.0 degrees, most preferably 2.0 and 4.0 degrees, where the area change may follow a cubic-spline profile. In some embodiments, a second diffuser 108 may provide an expansion in a vertical axis, a horizontal axis, or both a vertical and a horizontal axis. In certain embodiments, fillets may be inserted into the corners of the second diffuser 108 in order to reduce the introduction of non-uniformities into the airflow at the point of intersection between the four walls of the second diffuser 108.

The second expanding corner 110 may have expansion ratio of about 1.01 to 10.00, more preferably about 1.01 to 7.00, even more preferably about 1.10 to 1.50, or about 1.31. Thus, the expansion ratio of the first expanding corner 106 need not be equal to the expansion ratio of the second expanding corner 110. For example, the expansion ratio of the first expanding corner 106 may be less than the expansion ratio of the second expanding corner 110. If desired, however, the expansion ratio of the second expanding corner 110 may also be 1.25. In certain embodiments, it may be desirous to sacrifice flow quality in exchange for a shorter return circuit. In such embodiments, the ratio of expansion for the second expanding corner 110 may be increased. To compensate for the resulting introduction of non-uniformities into the airflow the airflow may be treated downstream of the second expanding corner 110. A smaller ratio, however, is advantageous in that the resulting slight increase in the overall size of the airflow circuit (versus higher ratios) may reduce risk of introducing non-uniformities into the airflow.

The second expanding corner 110 may comprise a rectangular end configured to couple with said second diffuser 108 and a rectangular end configured to couple with the rectangular end of a third diffuser 112.

The third diffuser 112 may couple the second expanding corner 110 with a fourth diffuser 114 and may transition from a first rectangular shape to a circular shape, with an equivalent conical angle between 0.1 and 10.0 degrees, more preferably between 1.0 and 7.0 degrees, most preferably 2.0 and 4.0 degrees, where the area change may follow a cubic-spline profile. As the equivalent conical angle increases in degrees, however, the risk of introducing flow separation and other non-uniformities into the wind stream also increases. For example, equivalent conical angles of 2 or 2.5 degrees may be used. Nevertheless, in certain embodiments, the use of higher equivalent conical angles may be advantageous as a means to shorten the overall length of the return circuit. The resulting non-uniformities introduced into such embodiments may be ameliorated through, for example, an air treatment applied downstream, such as the passing the airflow through a flow straightener composed of hexagonal comb immediately before the contraction nozzle 120.

With reference to a vertical wind tunnel 100 having a 14 foot flight chamber 102 used for recreational purposes, the diameter of the circular ends of the third diffuser 112 and the fourth diffuser 114 may be, for example, 10 to 80 feet, more preferably 20 to 40 feet, and most preferably about 30 feet. However, as discussed above, one of skill in the art would understand that these values are relative to the size tunnel one is building. The fourth diffuser 114 may transition from the circular shape to a second rectangular shape, with an equivalent conical angle between 0.1 and 10.0 degrees, more preferably between 1.0 and 7.0 degrees, most preferably 2.0 and 4.0 degrees, where an area change follows a cubic-spline profile. The second rectangular shape at the exit of the fourth diffuser 114 may be rotated 90 degrees relative to the first rectangular shape at the entrance of the third diffuser 112. By rotating the rectangular airflow by 90 degrees, this geometric transition enables the use of a shallow, wide excavation when those sections are located underground rather than a narrow, deep excavation, which would tend to cost more to perform during construction. Said 90-degree geometric rotation also facilitates returning the rectangular airflow to a square-shaped (or other quadrilateral) airflow after the airflow passes through the third expanding corner 116, the (optional) fifth diffuser 117, and the fourth expanding corner 118.

The third and fourth diffusers 112, 114 define a return tower 128 that may house a power station 200 to accelerate the air. The power station 200 may include a single fan 202, motor-support vanes 204, a motor (not shown), and a gear box (not shown) that may be used to increase torque of a large-mass fan. In certain embodiments, as discussed below, the power station 200 may employ a plurality of fans. In certain embodiments, fillets may be inserted into the corners of the third and/or fourth diffusers 112, 114 in order to reduce the introduction of non-uniformities into the airflow at the point of intersection between the four walls of the third and/or fourth diffusers 112, 114.

Figure 1B:
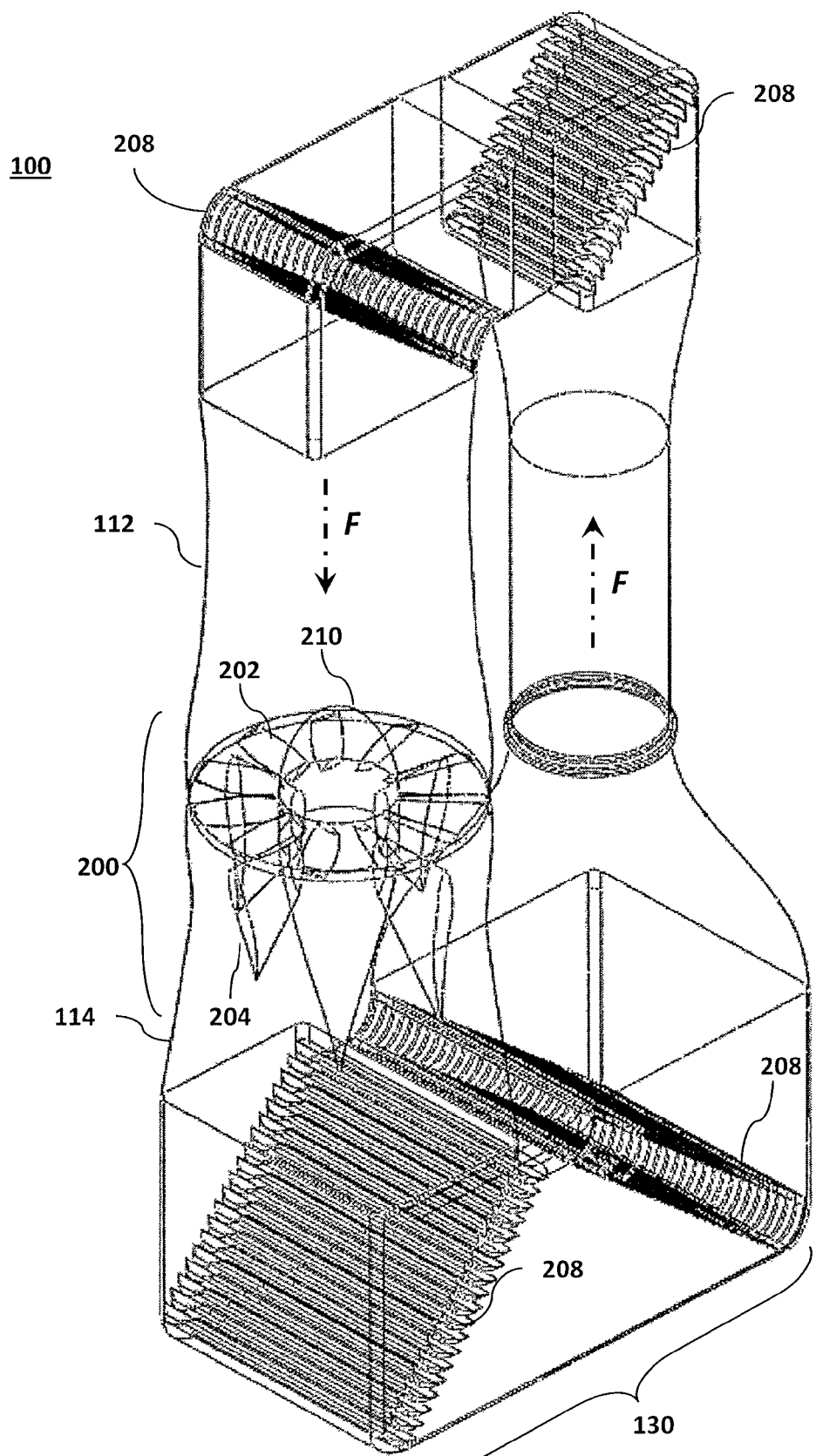
Figure 2A:
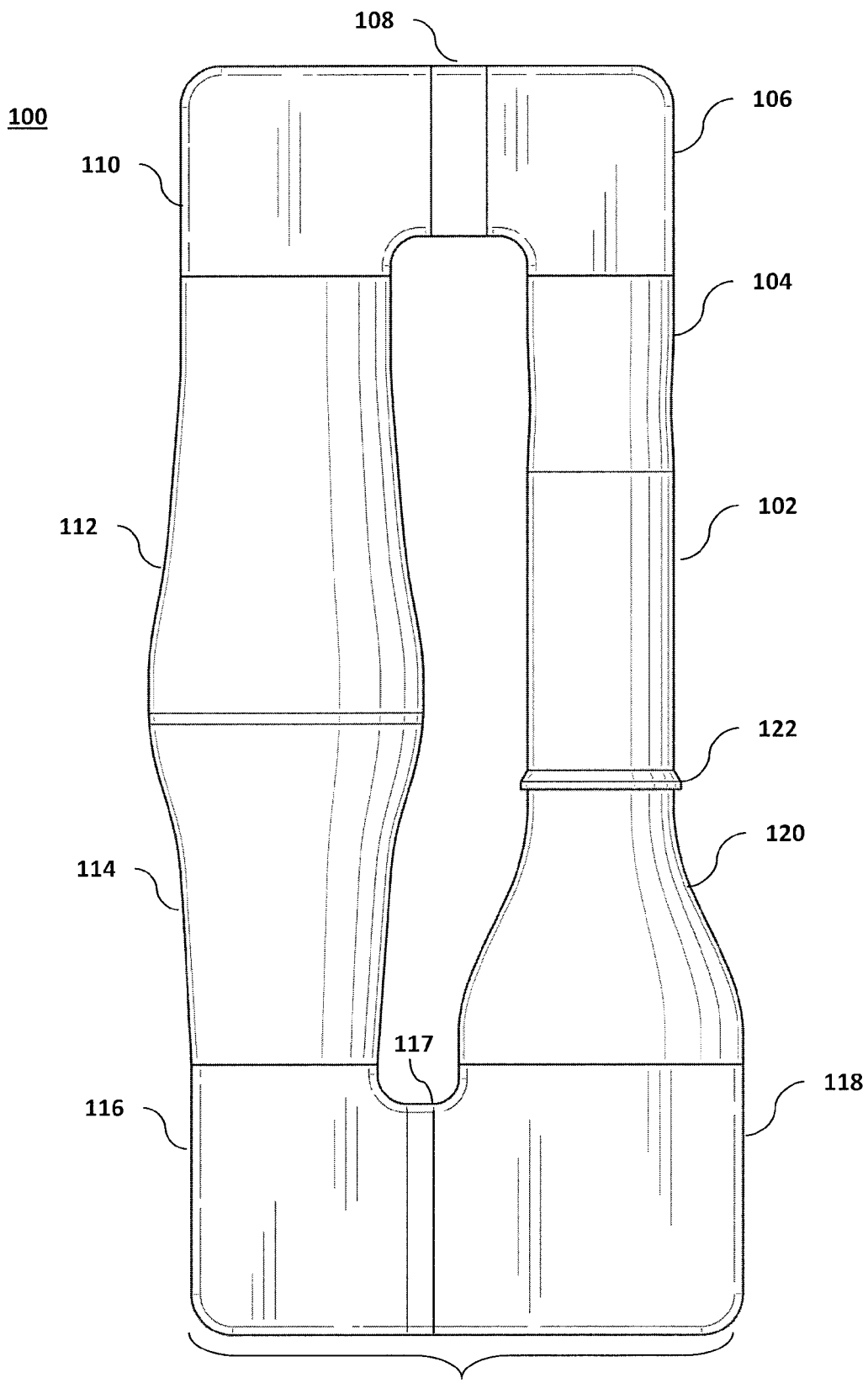
FIG. 2a is a first side view of an exemplary embodiment of the vertical wind tunnel.
Figure 2B:
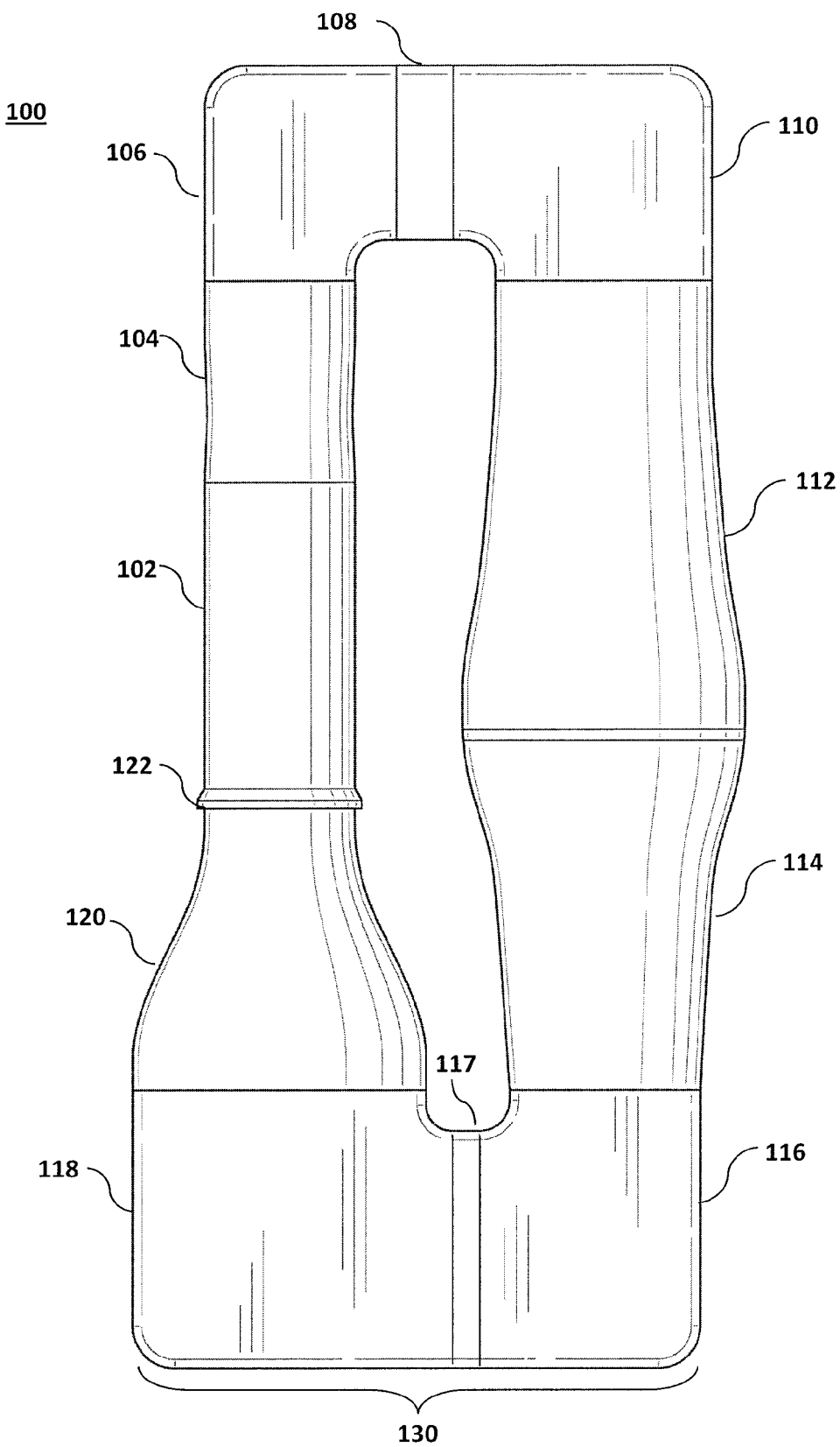
FIG. 2b is a second side view of an exemplary embodiment of the vertical wind tunnel.
Figure 2C:
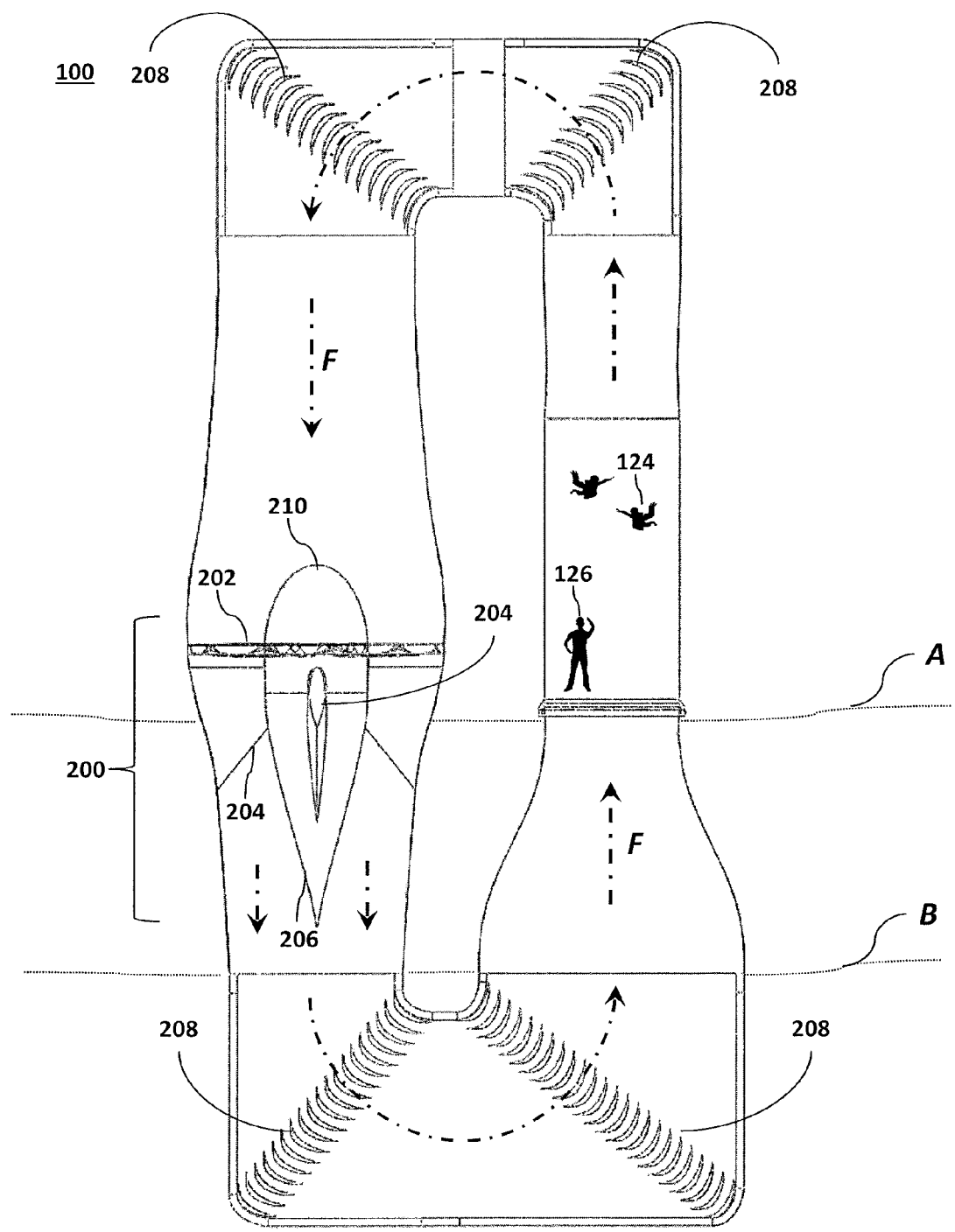
Figure 3A:
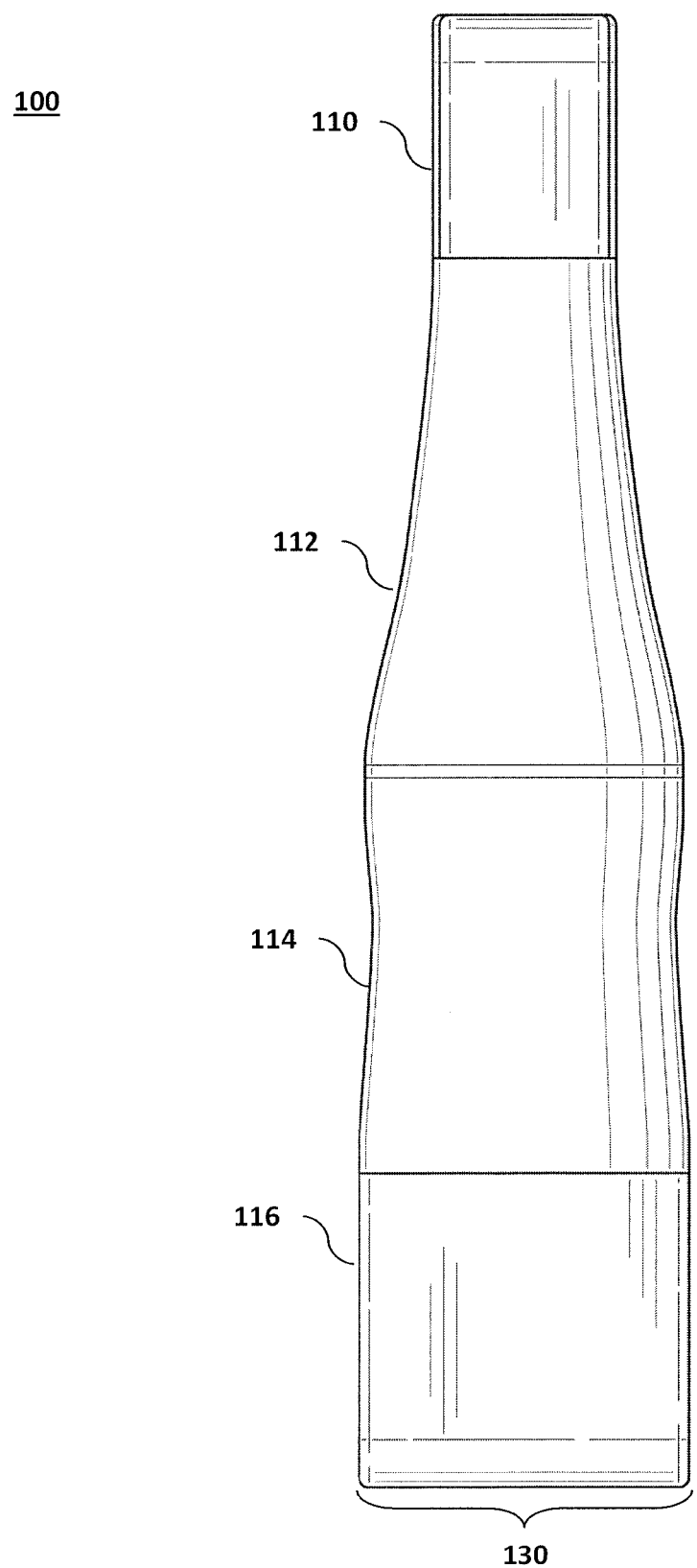
FIG. 3a is a rear view of an exemplary embodiment of the vertical wind tunnel.
Figure 3B:
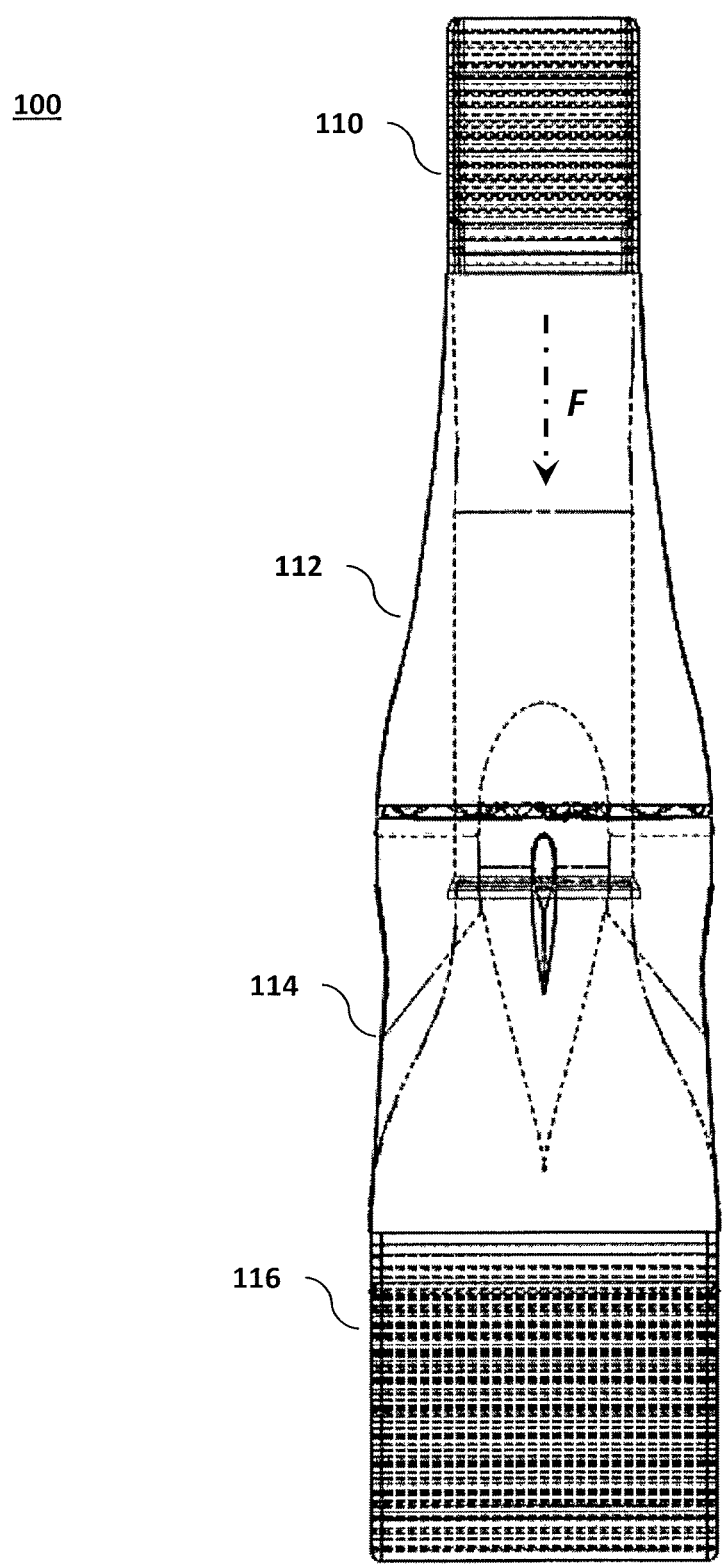
Figure 4A:
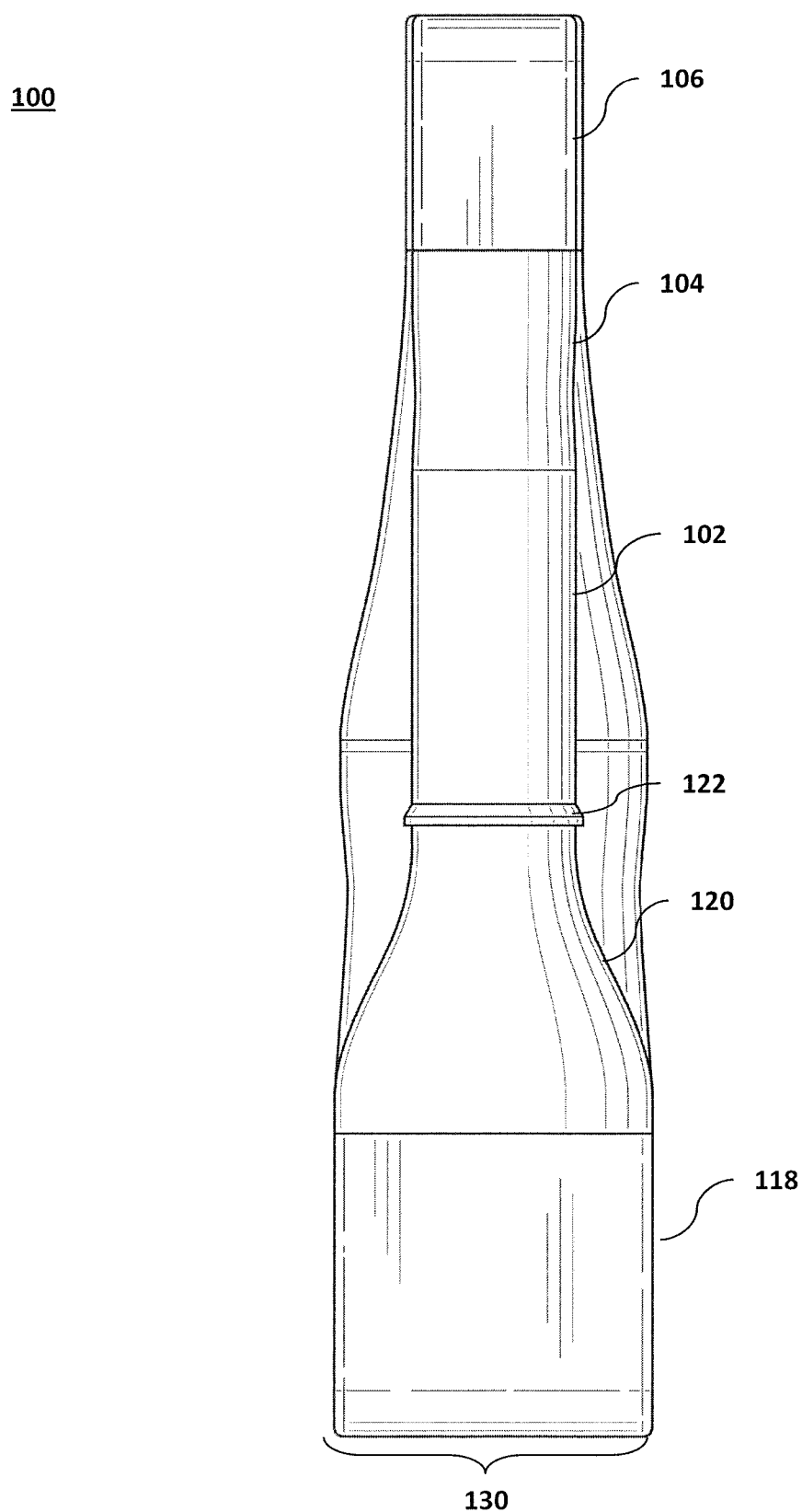
FIG. 4a is a front view of an exemplary embodiment of the vertical wind tunnel.
Figure 4B:
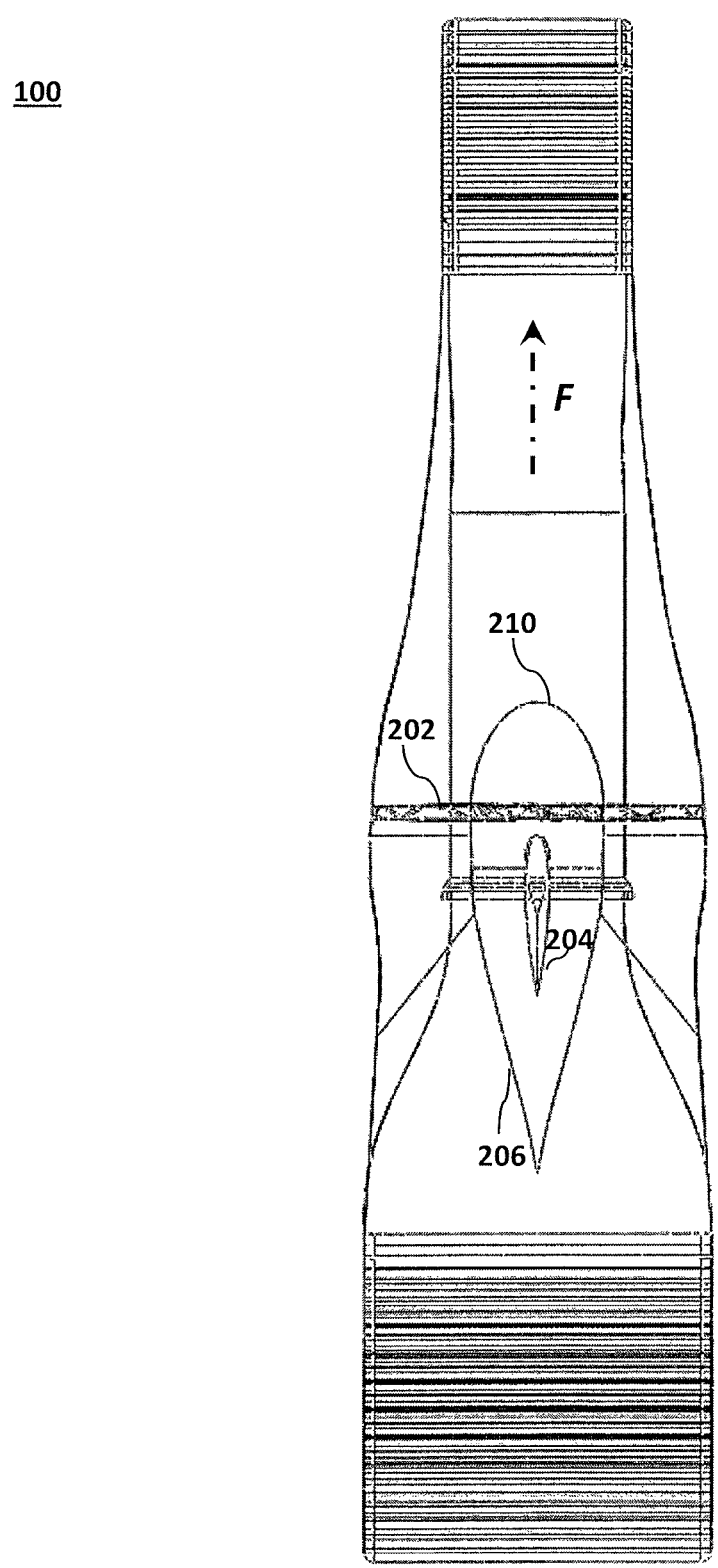
Figure 5:
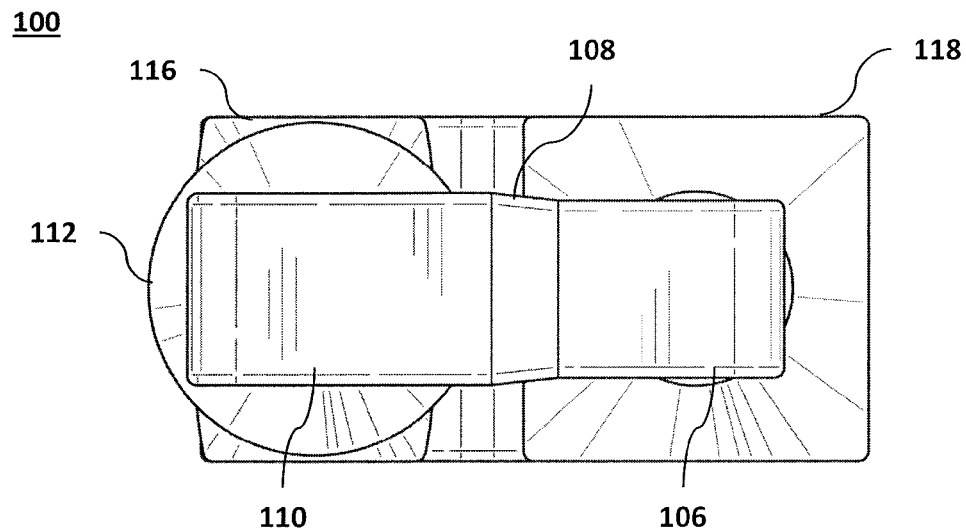
FIG. 5 is a top view of an exemplary embodiment of the vertical wind tunnel.
Figure 6:
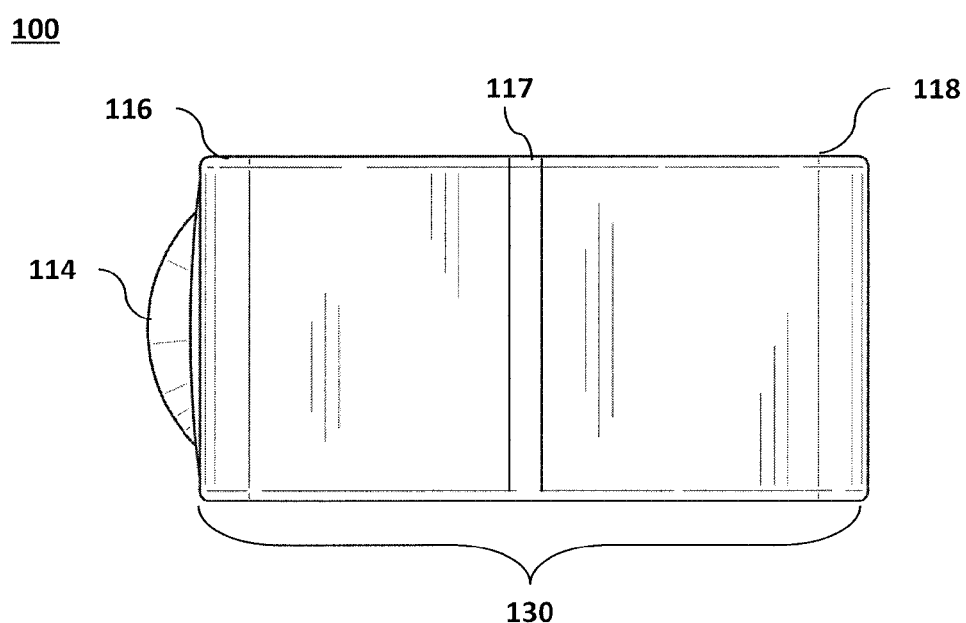
FIG. 6 is a bottom view of an exemplary embodiment of the vertical wind tunnel.
Figure 7A:
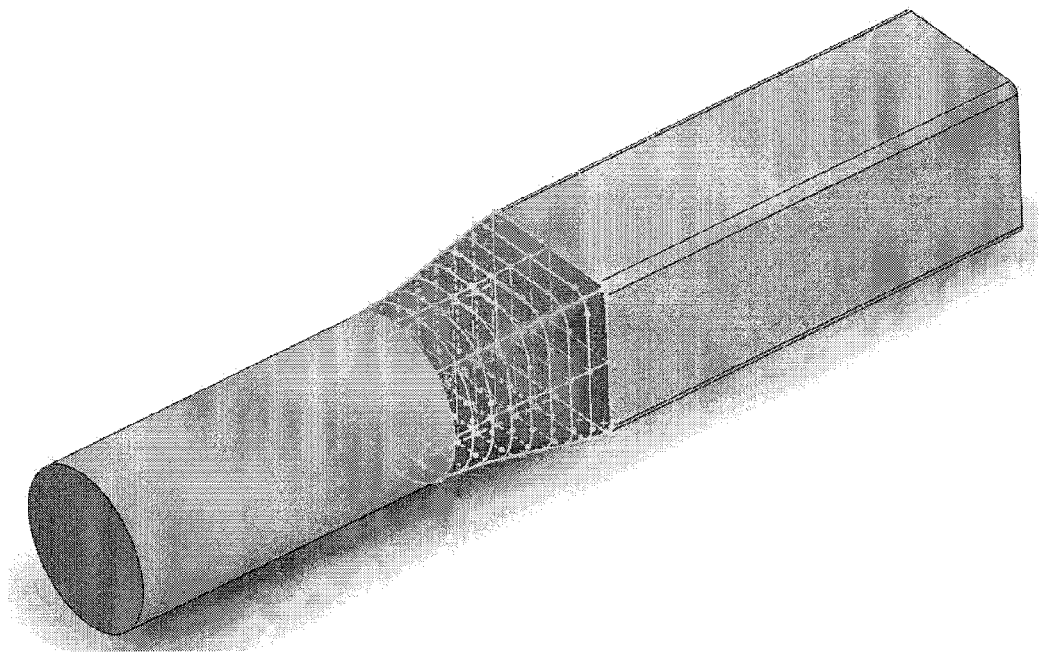
FIGS. 7a through 7d illustrate an example cubic-spline diffuser geometry for the first diffuser.
Figure 7B:
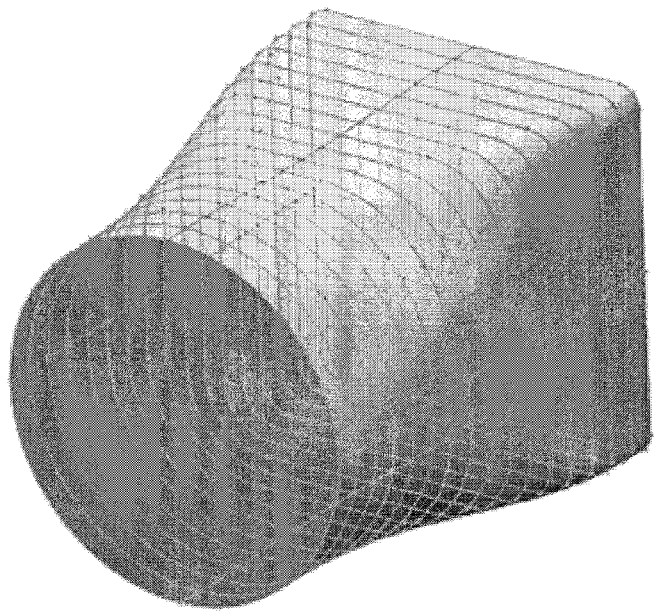
Figure 7C:
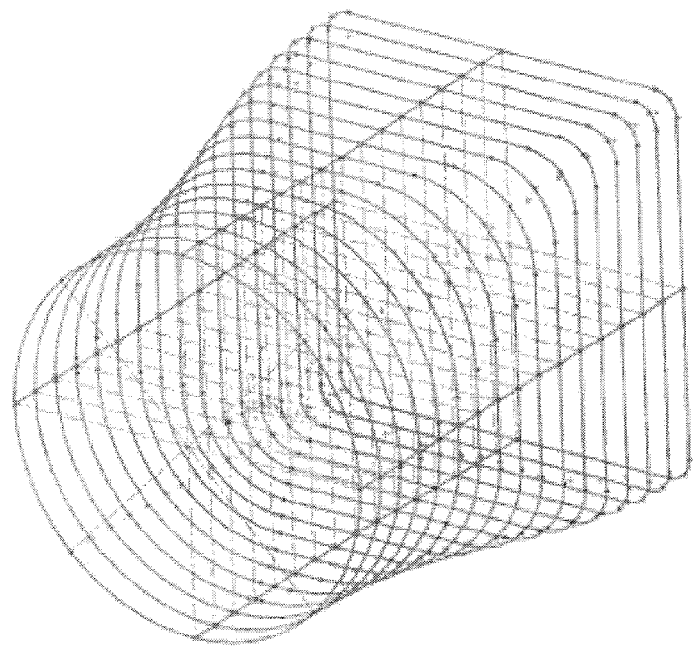
Figure 7D:
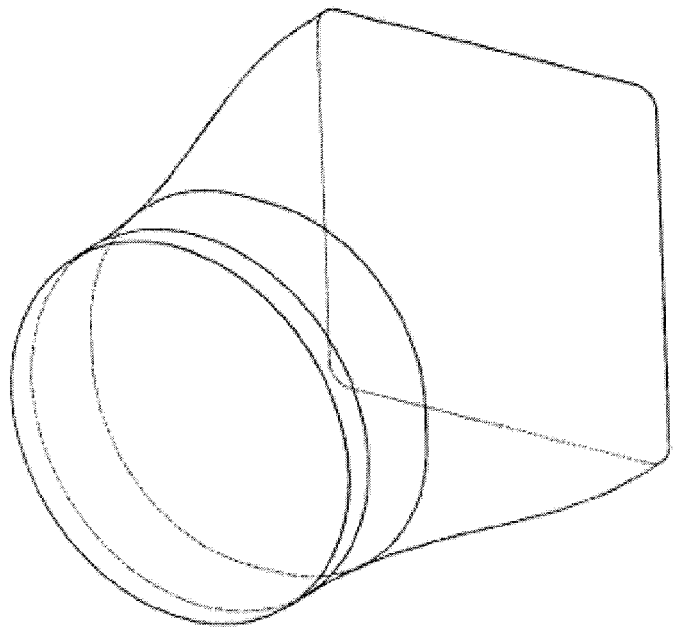

The power station 200 may further comprise a cone 210 and a fan nacelle 206, which may be used to house the motor and the gear box. For example, as illustrated in FIG. 1b, the power station 200 may be positioned at or near the connection point between the third diffuser 112 and the fourth diffuser 114. In other embodiments, the power station 200 may be located in the base (e.g., an underground plenum) located between the third expanding corner 116 and the fourth expanding corner 118, possibly in the fifth diffuser 117. Alternately, the power station 200 may be located in the second diffuser 108 or the first diffuser 104, or the connection points between said first and second diffusers and the surrounding sections. In yet other embodiments, the power station 200 may be located after the fourth expanding corner 118 and before the contraction nozzle 120.

A fan 202 may be provided with an area ratio of between 1:1 and 10:1 (fan 202 to flight chamber 102 cross area). For example, a low-acoustic fan may be designed with a large hub diameter and nacelle geometry. The use of a single fan generally results in higher MTBF, as well as a much quieter operation when compared to systems using multiple fans. However, in some embodiments multiple smaller fans may be utilized. In some embodiments, such as when the fan 202 and attached motor are located in the return tower 128, the fan 202 and attached motor may be configured so as to be removable from the top so as to facilitate easy replacement and/or repair. Anti-swirl vanes may employ, for example, a constant thickness, swept chord, and swept thickness-to-chord ratio.

While a single return tower 128 is illustrated, one of skill in the art would appreciate that plural return towers 128 may be employed. For example, a designer may employ two or more return towers 128 to reduce the depth of the underground excavation required to build a wind tunnel with a flight chamber at or near ground level—for example, instead of a single return to a depth of 50 feet underground, the facility could utilize two returns each at a depth of approximately 25 feet. However, with the increased number of return towers 128 comes an increase in air turbulence as well as a potential increase in the above-ground construction cost and an adverse impact on the MTBF due to the increased number of components to manufacture, assemble and maintain. When plural return towers 128 are employed, each return tower 128 may comprise a power station 200.

A third expanding corner 116 and a fourth expanding corner 118 may be coupled to one another, possibly by a fifth diffuser 117 positioned therebetween, and configured to function as, or define, the base 130 (e.g., a plenum) of the vertical wind tunnel 100's structure. As illustrated, the third expanding corner 116 may be coupled with a second rectangular-shaped end of the fourth diffuser 114. The third expanding corner 116 and a fourth expanding corner 118 may be fabricated as a single unit separated by a channel, or as two separate components coupled at their rectangular ends, either directly, or, or illustrated, via a fifth diffuser 117 positioned between the third expanding corner 116 and the fourth expanding corner 118. The third expanding corner 116 and fourth expanding corner 118 may each have an expansion ratio of about 1.01 to 10.00, more preferably about 1.01 to 7.00, even more preferably about 1.10 to 1.50, or about 1.31. Thus, in certain embodiments the expansion ratio of the third expanding corner 116 and the fourth expanding corner 118 may be the same as the expansion ratio of the second expanding corner 110, but greater than that of the first expanding corner 106. As a result, the mean average expansion ratio of the third expanding corner 106 and the fourth expanding corner 118 is generally greater than the mean average expansion ratio of the first expanding corner 106 and the second expanding corner 110. If desired, however, the expansion ratios of the third expanding corner 116 and the fourth expanding corner 118 may equal to or smaller than the expansion ratio of the third expanding corner 106 and/or the fourth expanding corner 118.

In certain embodiments, the third expanding corner 116 and fourth expanding corner 118 may be located below ground, requiring excavation for their construction. Generally, the cost of excavation increases arithmetically along the horizontal axis (the length of the dig) and increases disproportionately higher along the vertical axis (the depth of the dig). To mitigate the cost of excavation, the expansion ratio one or both of the third expanding corner 116 and the fourth expanding corner 118 may be increased. The increased ratio will cause the introduction of non-uniformities into the air flow that, if advantageous, can be treated downstream, typically through the use of a flow straightener before the contraction nozzle 120, as previously described above.

The base 130 may be installed below ground so as to reduce the height of the overall structure, reduce the temperature of the air (e.g., due to ground cooling), and enable entry of the flight chamber 102 by users at, or near, ground level. Thus, when installed, certain components, such as the fourth diffuser 114, third expanding corner 116, fifth diffuser 117, fourth expanding corner 118, and contraction nozzle 120, may be buried (e.g., within the ground) such that the breather slot 122 is positioned at, or just above, ground level. For example, the fourth diffuser 114, third expanding corner 116, fifth diffuser 117, fourth expanding corner 118, and contraction nozzle 120 may be substantially underground (indicated via line A in FIG. 2c), or just the third expanding corner 116, the fifth diffuser 117, and the fourth expanding corner 118 may be substantially underground (indicated via line B in FIG. 2c). In some embodiments, the base 130 may expand along its length at an equivalent conical angle between 0.1 and 10.0 degrees, more preferably between 1.0 and 7.0 degrees, most preferably 2.0 and 4.0 degrees. However, as discussed above with regard to the potential for flow separation and other non-uniformities, the equivalent conical angles may be greater.

In other embodiments, the expansion of the base 130 may be generated, at least in part, by adding a slope to the flooring between the third expanding corner 116, the optional fifth diffuser 117, and the fourth expanding corner 118, which the shallow end at the third expanding corner 116 and the deep end at the fourth expanding corner, said slope serving a second purpose, which is to channel water to a drain hole located about the fourth expanding corner 118. In yet other embodiments, such as construction into a hillside, only the third expanding corner 116 or, alternately, the fourth expanding corner 118 may need to be substantially underground, thus saving excavation costs. In another embodiment, the fourth diffuser 114, third expanding corner 116, fifth diffuser 117, fourth expanding corner 118, and contraction nozzle 120 may be substantially above underground, with customers utilizing stairs or some other conveyance to reach the elevation of the flight chamber 102.

A contraction nozzle 120 may be used to provide a quadrilateral (e.g., a square, as illustrated) to circular transition and couple the fourth expanding corner 118's square end to the circular flight chamber 102. The contraction nozzle 120 may employ a predetermined cross-sectional area contraction ratio (e.g., about 2:1 to 10:1, more preferably about 3:1 to 6:1, and most preferably about 5:1) and a predetermined length-to-width ratio (e.g., about 0.50 to 2.0, or more preferably 0.75 to 1.25, and most preferably, about 1.0). The area change may follow the cubic-spline profile and it may also follow the fifth order polynomial profile. Thus, to improve pressure recovery and flow uniformity, at each geometric transition (e.g., from a polygon to circle, and vice versa) an equivalent, conical angle between 0.1 and 10.0 degrees is combined with a cubic-spline profile, rather than simple lofting.

Figure 8:
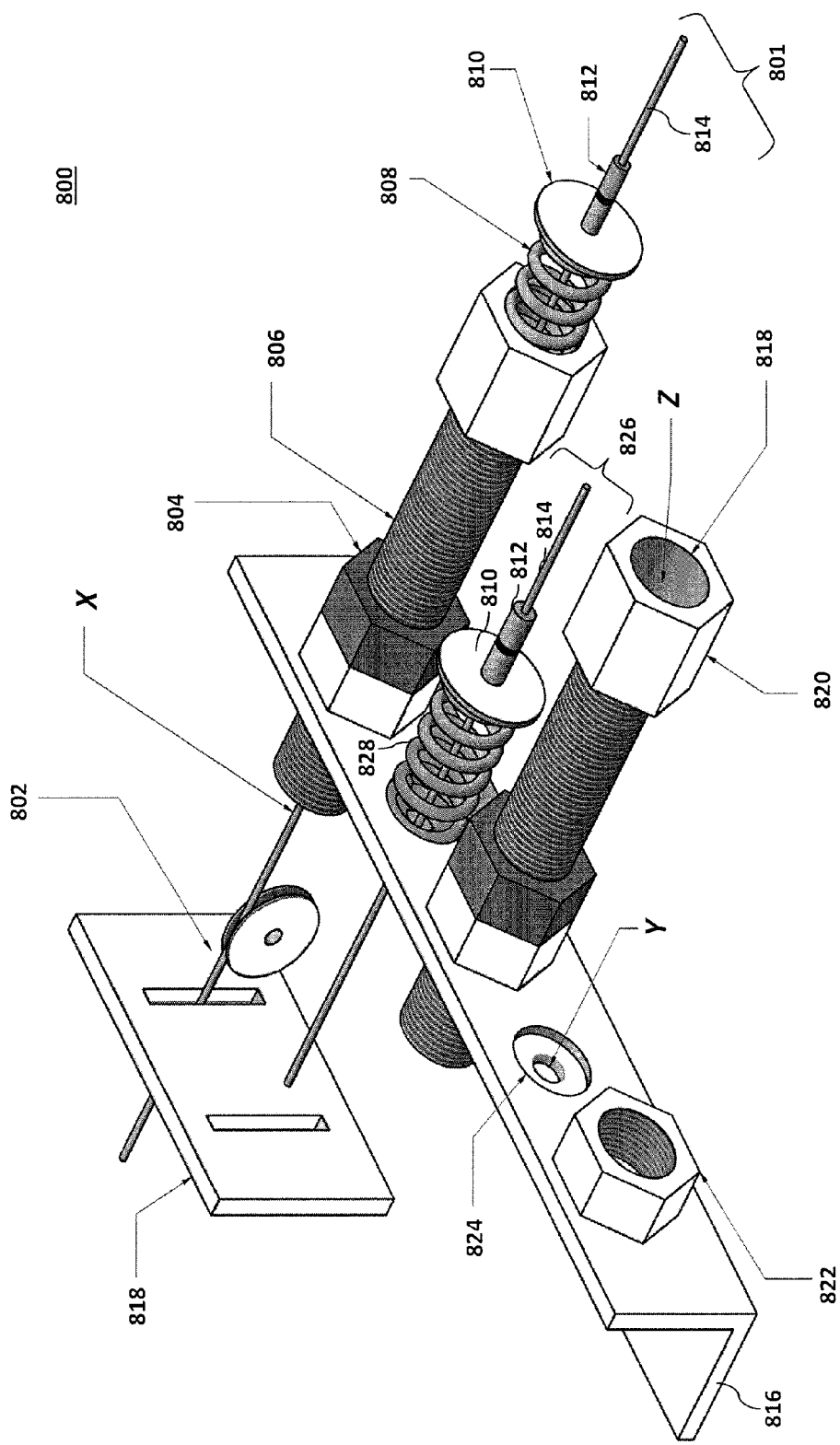
FIG. 8 illustrates a net pulley arrangement for use with a wind tunnel.

A breather slot 122 may be located immediately upstream of a safety net, which may attach to net pulleys, as illustrated in FIG. 8, that adjust the tautness and/or facilitate replacement of the netting device or supporting cables. In some embodiments, the breather slot 122 may be located downstream from the safety net and either at the entrance of or upstream of the first expanding corner 106, such as at the connection point between the flight chamber 102 and the first diffuser 104.

As illustrated, the expanding corners of the vertical wind tunnel 100 (e.g., first expanding corner 106, second expanding corner 110, third expanding corner 116, and fourth expanding corner 118) may comprise a plurality of internal turning vanes 208. The plurality of internal turning vanes 208 are configured to assist in changing the airflow direction by 90 degrees. The internal turning vanes 208 may also providing cooling functionality using fluid-cooling techniques (e.g., water-cooling or air-cooling). For example, the internal turning vanes 208 may be hollow and have heat transfer fluid (e.g., cool water, other liquids, or air) pumped therethrough. In operation, the air passes through the anti-swirl vanes, which redirects the air from a substantially vertical to a substantially horizontal path (or vice versa, depending on the corner).

Generally, it is advantageous to mitigate energy needed to cool air passing through a wind tunnel. Existing systems typically rely on energy to circulate and cool heat transfer fluid through, for example, a heat exchanger. However, such heat exchanging systems require a significant amount of energy to circulate and cool the heat transfer fluid. To mitigate this cost, a wind tunnel as disclosed herein may harness the cooling effects of the earth through a ground-coupled heat exchanger. A ground-coupled heat exchanger uses an underground heat exchanger that can capture heat from and/or dissipate heat to the ground. Such ground-coupled heat exchangers use the Earth's near constant subterranean temperature to cool heat transfer fluid that is then used to cool air circulating through the wind tunnel. In certain aspects, ground-coupled heat exchanger may also use air, water, and/or antifreeze as a heat transfer fluid, often in conjunction with a geothermal heat pump.

Such a ground-coupled heat exchanger may be constructed using a pipe buried underground where the year-round ambient earth temperature is, depending on region, typically 10 to 23° C. (50-73° F.) at 1.5 to 3 meters (5 to 10 feet). However, because ground temperature becomes more stable with depth, the pipe may be positioned deeper to provide a cooler, more stable, temperature. For instance, the pipes may be buried about half way between the surface of the base 130 and the ground level. For example, the pipe may be positioned about 20 feet below the earth's surface, where the temperature is more stable. In operation, heat transfer fluid is communicated through the subterranean pipe where the earth's temperature cools the heat transfer fluid prior to being sent to the heat exchanger (e.g., turning vanes 208 or, in an alternate example, vertical vanes running from the ceiling to the floor in the underground plenum defined by third expanding corner 116, fifth diffuser 117 (optional), fourth expanding corner 118), where the cooled heat transfer fluid is then used to cool the air in the wind tunnel. In certain embodiments, the ground-coupled heat exchanger may be positioned solely in the submerged portion of the vertical wind tunnel 100 (e.g., third expanding corner 116, the fifth diffuser 117, and/or fourth expanding corner 118) so as to obviate the need to pump the fluid vertically, thus saving even more energy. That is, lateral movement of the heat transfer fluid requires less energy. For water adjacent facilities, a water-to-air heat exchanger may be used, whereby a large body of water (e.g., lake, ocean, river, etc.) is used to cool the fluid within the tube.

Another method to mitigate the energy needed to cool the airflow is to pass a heat-transfer fluid, such as described above, over the outside shell of the return, and particularly the underground plenum. Such a system may be combined advantageously with a ground-coupled heat exchanger for cooling the returned fluid. The shell of the return should be thin and non-rusting with a low insulation value, such as stainless steel sheet.

During normal operation, wind tunnels may generated mold growth due to any number of factors, such as being located in a humid area, internal condensation due to cooling vanes, and the use of water for an evaporative-cooling system. To address potential mold issues, the various components of the vertical wind tunnel 100 (e.g., the expanding corner, diffusers, etc.) may be fabricated from, or otherwise incorporate, mold-resistant materials. For example, the various components may be fabricated from extruded aluminum, injection molded plastic, or the like, and, importantly, sealed with mold-resistant sealant (e.g., caulking) In an example, the internal turning vanes 208 may be fabricated from, for example, a composite material (e.g., fiberglass, carbon fiber, etc.) metals, metal alloys, etc., and/or sealed with a mold-resistant sealant.

As noted above, the wind tunnel may further employ a tilted floor to direct any water resulting from condensation (and other moisture sources) to a drain. For example, the base defined by the third expanding corner 116, fifth diffuser 117, and the fourth expanding corner 118 may be tilted (e.g., up to 10.0 degrees, more preferably, up to 2.0 degrees, and most preferably about 0.5 to 1.0 degree). The wind tunnel may further comprise debris netting and, optionally, a tray to collect the debris. In some embodiments, the debris netting and optional tray are located in the area between the first diffusing corner 106 and the second diffusing corner 110 and, more preferably, at the exit of the second diffuser 108.

Testing and computational modeling was performed to confirm that the forgoing vertical wind tunnel 100's design was advantageous over existing systems. The results indicate that the present design provides premium air quality, lower operating cost (e.g., electric consumption), higher wind speeds, is easier to maintain, has a reduced (e.g., small) footprint, requires fewer parts to manufacture, is faster to build/assemble, and is less costly to build. Further, testing indicates that the first diffuser 104 produced improvements in pressure recovery and in flow uniformity when utilizing a cubic-spline profile. Analysis was focused on assessment of flow velocity and total pressure across the cross section at the end of first diffuser 104 and along symmetry planes of the section, including through the corners of the square end. The results indicate that a first diffuser 104 utilizing a cubic-spline profile provides both improvements in pressure recovery and in flow uniformity.

Within a particular design (standard or cubic-spline) pressure recovery is similarly driven by length with no clear improvement at each discrete length over the theoretical pressure recovery or the round (non-transitioning) diffuser. Similarly, flow uniformity for an empty flight chamber 102 (a/k/a, a clean configuration) does not appear to be impacted significantly by the first diffuser 104's length. With flyers in the flight chamber 102, however, diffuser length does have an impact on flow uniformity with additional length providing better uniformity. This effect is more pronounced as more flyers 124 are introduced into the flight chamber 102. Looking at the data downstream of the diffuser outlet for a 14 foot circular flight chamber, it appears the improvement in flow uniformity is substantial from diffuser lengths of 10 to 12 feet and from 12 to 15 feet, with a further (but less drastic) improvement from 15 to 20 feet. However, the ideal diffuser length varies with the width and shape of the flight chamber. Though these variations are not linear, a person of skill would understand how to determine the ideal diffuser length for a flight chamber of a particular size and shape.

As explained above, the first expanding corner 106 may have an expansion ratio of less than 1.25:1; while the second expanding corner 110, the third expanding corner 116, and the fourth expanding corner 118 each have an expansion ratio of about 1.25:1. This particular arrangement may be selected in order to minimize risk of flow separation in the first expanding corner 106 that can be attributed to large wakes from the flyers in the flight chamber. Further, each of the first diffuser 104, the second diffuser 108, the third diffuser 112, and the fourth diffuser 114 were configured such that they expand at an equivalent conical angle between 0.1 and 10.0 degrees, more preferably between 1.0 and 7.0 degrees, most preferably 2.0 and 4.0 degrees. In some embodiments utilizing a fifth diffuser 117 between the third expanding corner 116 and fourth expanding corner 118, said diffuser may be configured such that expands at an equivalent conical angle between 0.1 and 10.0 degrees, more preferably between 1.0 and 7.0 degrees, most preferably 2.0 and 4.0 degrees. However, as discussed above with regard to the potential for flow separation and other non-uniformities, the equivalent conical angle may be greater.

Initial testing was performed using computational fluid dynamics ("CFD") analysis with the vertical wind tunnel 100 with an empty flight chamber 102 at both 116 mph and at 180 mph in order to verify and validate that circuit flow quality is adequate. The CFD analysis initially identified a number of areas of poor flow quality, with the worst flow quality found in the return tower 128 when standard diffuser geometry was employed. For example, the area upstream of the fan in the return tower 128 (i.e., within the third diffuser 122) was found to have a very low flow velocity and thus an area where flow is separated. To address this issue, a cubic-spline profile was applied to each of the third diffuser 112 and the fourth diffuser 114 in the return tower 128. All area ratios and inlet and outlet cross-sectional profiles were otherwise unchanged, but the area change could be updated for systems with plural return towers. Once updated, the CFD analysis was reassessed with the cubic-spline profile and a noticeable improvement in flow quality and flow uniformity was identified.

The results from the CFD analysis allows for the estimation of power consumption for each condition. Power estimation was based on the calculation that [fan ideal power]=[volumetric flow rate]×[system pressure drop]. The fan ideal power was then aggressively de-rated to account for a 90% efficiency for the aerodynamics of the fan and a 90% efficiency for the electric motor and VFD combination for an overall system efficiency of 81% (90%×90%). However, an overall system efficiency of about 90% efficiency is expected at many speeds based on the known efficiencies of VFDs and premium-efficiency motors available in the market today. The resultant power estimations are consistent with the expectations for an efficient wind tunnel circuit design of this nature. The power estimates for conditions with an empty flight chamber 102 are valid off the CFD analysis as it was solved.

The power estimates for the conditions with flyers included, however, may require further refinement since the body attitude of the flyers included in the analysis creates more drag at the assessed test velocities than the anticipated weight of the flyers. For example, at 180 mph with four flyers in the test section, the measured drag of each of the four flyers is ~390 pound force (lbf), which is substantially greater than the expected weight of a flyer (about 160 lbs). Since a hover condition requires that the drag of the flyers be equal to their weight, power estimations for hovering flight for any combination of flyers and flight velocity can be estimated from the baseline by determining the amount of power required to overcome the aerodynamic drag of the flyers for a given condition.

The power required to overcome aerodynamic drag is as follows: [power]=[velocity]×[drag]. If drag must equal weight, then the total power requirement for a given condition is equal to the baseline power for the condition plus the power required to overcome the weight of a flyer multiplied by the number of flyers or [total power]=[baseline power]+([flyers]×[velocity]×[weight of each flyer]) As a validation of the CFD prediction, the same methodology was used to calculate the power of the circuit operating at 180 mph with four flyers who have a weight of 160 lbs. The resultant calculation comes out to 2,622.84 HP compared to the 2,677.12 HP measured directly in CFD. The relatively small delta 54.28 HP (or about two percent) can potentially be attributed to inefficiencies brought about by the propagation of wakes of the flyers throughout the circuit. Using the simplified calculation described above, the power estimation of various tunnel velocities and number of flyer combinations has been prepared, indicating that the efficiency of the subject vertical wind tunnel 100's design for single flyers is about twice as efficient as that of conventional vertical wind tunnels.

An example net pulley arrangement 800 for supporting the netting device is illustrated in FIG. 8, which may be used in connection with vertical wind tunnel 100, or any other net system. Thus, the pulley arrangement 800 disclosed in FIG. 8 should not be construed as being limited to use with the vertical wind tunnel 100, but rather, may be employed with traditional wind tunnels, or any other system employing a cable supported net or screen, or where cable tautness is to be maintained. The pulley arrangement 800 is advantageous in that it permits a quick installation, can be installed without requiring a second installer, may be periodically adjusted generate a consistent tension on the cable even as said cable fatigues, which results in a longer cable life and a safer net. Finally, it is easy to spot damage to, sabotage, or accidental mis-installation of, the cable or other component of the pulley arrangement 800.

As illustrated, such a pulley arrangement 800 may comprise a head end unit 801 positioned at an end (or both ends) of a cable 814, and may comprise: (1) a pulley block 802, which may be a replaceable part that absorbs sawing; (2) a jam nut 804 to prevent bolt movement; (3) a tensioning bolt 806 that is adjustable in length; (4) a compression spring 808 that allows for visual measurement, and inspection; (5) a washer (preferably a capture washer) 810; (6) one or more (most preferably two) swages 812; (7) a bolt head 820 (or bolt head portion or coupling nut), which may comprise a deep countersink to act as a first spring guide 818; and (8) a fixturing nut 822, which may be bolted to net frame 816. The frame may also comprise a countersink to act as a second spring guide 824. The pulley arrangement 800 may further comprise a receiving end unit 826 positioned at an end of a cable 814 opposite a head end unit 801, and may comprise: (1) a second compression spring 828; (2) a washer (preferably a capture washer) 810; and (3) one or more (most preferably two) swages 812. As illustrated, the pulley arrangement 800 may comprise a plurality of cables 814 configured in a planar parallel arrangement, where the proximal ends of the cables 814 alternate between comprising a head end unit 801 and a receiving end unit 826. In certain embodiments, each cable 814 comprising a head end unit 801 connected to an end of the cable 814 may further comprise a receiving end unit 826 connected to the opposite end of the cable 826. In certain embodiments, the fixturing nut 822 may be integrated with the frame 816, such as through welding. For example, the frame 816 may be threaded and configured to directly receive the tensioning bolt 806. The bolt head 814's material may be hardened (e.g., hardened steel) to increase strength and usable life. As illustrated at points X, Y, and Z, the component adjacent the cable 814 (e.g., through-holes) may be filleted to reduce sawing by the cable 814. Further, the cable ring 818 (e.g., the vertical wind tunnel 100's wall) may be slotted to avoid sawing by the cable 814. A suitable distance between the tensioning bolts 806, when used with the vertical wind tunnel 100, may be about 4 inches on center, but one of skill in the art would recognize that other distances may be employed depending on the particular need. For example, according to one embodiment, a 1" threaded stainless bolt 806 may be used with 3/32" stainless cable 814. In certain aspects, a threaded rod may be used in lieu of a bolt, with a coupling nut (e.g., a tall nut, such as a 2 to 3 inch nut) that functions as the bolt head. The coupling nut may be screwed to the threaded rod about half down the nut's length and secured to the rod using, for example, a tack weld. The open end of the coupling may be configured to fit the spring.

Another consideration wind tunnel fabrication is sound absorption. During operation of the vertical wind tunnel 100, a considerable amount of sound resonates from, for example, the motor, the fan blades, and the movement of air. To address such noise from the wind tunnel, perforated sheet metal of specified open area ratio and sound absorbing material may be provided along the walls of the tunnel. The hole size, hole pattern and open area ratio may be selected to address a particular need. The sound absorbing material, which may be shaped to include a plurality of protrusions, may be fabricated from, inter alia, plastic. The plurality of protrusions may employ one or more shaped profiles, including, for example, pyramidal, conical, rounded, etc.

An issue that can arise, however, is the potential for the accumulation of contaminants, such as dust and/or debris, on the sound absorbing material. Such an accumulation of contaminants reduces the effectiveness of the sound absorbing material, while also exposing the user of the wind tunnel to such contaminants, which may contain allergens. Thus, to mitigate this accumulation, an acoustically transparent layer (e.g., a fabric, screen, resin, or other material) may be provided between the perforated sheet metal and the sound absorbing material. The term "acoustically transparent" means that acoustic energy is able to enter and transit through the material with a minimal amount of reflection. The acoustically transparent layer would effectively block the contaminants from encountering the sound absorbing material, while also allowing sound waves to pass and be absorbed by the sound absorbing material. In certain aspects, the fan may be a ducted fan whereby the fan blades are mounted within a cylindrical shroud or duct. In such an example, the cylindrical shroud or duct may be acoustically transparent.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A skydiving simulator, the skydiving simulator comprising:
   a fan operatively coupled with a motor; and
   a recirculating wind tunnel having a flight chamber, a plurality of diffusers, a plurality of expanding corners, and a return,
   wherein the plurality of expanding corners comprises a first expanding corner and a second expanding corner, each of said first expanding corner and second expanding corner comprising an inlet having an inlet cross sectional area defining an inlet plane and an outlet having an outlet cross sectional area defining an outlet plane, the inlet plane being substantially perpendicular to the outlet plane, wherein the ratio of the inlet cross sectional area to the outlet cross sectional area defines an expansion ratio that is greater than one; and
   wherein the return is configured to have disposed therein the fan.

2. The skydiving simulator of claim 1, wherein each of said plurality of expanding corners has an expansion ratio of between about 1.01 to about 3.00.

3. The skydiving simulator of claim 2, wherein the expansion ratio of at least one of said plurality of expanding corners is between 1.10 and 1.50.

4. The skydiving simulator of claim 3, wherein the flight chamber is fabricated from one or more transparent panels to permit an unrestricted view of activities taking place in the flight chamber.

5. The skydiving simulator of claim 1, further comprising a netting device positioned at an upstream end of said flight chamber, the netting device being coupled to a net frame via at least one cable, each of said at least one cable having a first distal end and a second distal end,
   wherein a head end unit is coupled to the first distal end and a receiving end unit is coupled to the second distal end,
   wherein the head end unit couples the first distal end to a first connection point on said net frame and comprises a first compression spring and a tensioning bolt that is adjustable in length, and
   wherein the receiving end unit couples the second distal end to a second connection point on said net frame and comprises a second compression spring.

6. A vertical wind tunnel comprising:
   a chamber;
   a plurality of diffusers;
   a plurality of expanding corners, wherein the plurality of expanding corners comprises a first expanding corner and a second expanding corner, each of said first expanding corner and second expanding corner comprising an inlet having an inlet cross sectional area defining an inlet plane and an outlet having an outlet cross sectional area defining an outlet plane, the inlet plane being substantially perpendicular to the outlet plane, wherein the ratio of the inlet cross sectional area to the outlet cross sectional area defines an expansion ratio that is greater than one; and
   a return, the return configured to have disposed therein a fan operatively coupled with a motor.

7. The vertical wind tunnel of claim 6, wherein each of said plurality of expanding corners has an expansion ratio of between about 1.01 to about 3.00.

8. The vertical wind tunnel of claim 7, wherein the expansion ratio of at least one of said plurality of expanding corners is between 1.10 and 1.50.

9. The vertical wind tunnel of claim 8, wherein the plurality of expanding corners further comprises a third expanding corner and a fourth expanding corner.

10. The vertical wind tunnel of claim 9, wherein the mean average expansion ratio of the third expanding corner and the fourth expanding corner is greater than the mean average expansion ratio of the first expanding corner and the second expanding corner.

11. The vertical wind tunnel of claim 10, further comprising a contraction nozzle disposed between said fourth expanding corner and said chamber, wherein the contraction nozzle transitions from a quadrilateral cross section to a round cross section.

12. The vertical wind tunnel of claim 8, wherein the chamber has a circular cross section and a substantially constant area along the chamber's length.

13. The vertical wind tunnel of claim 8, wherein the expansion ratio of the first expanding corner is not equal to the expansion ratio of the second expanding corner.

14. The vertical wind tunnel of claim 8, wherein at least one of said plurality of diffusers or said one or more expanding corners (1) is fabricated using a mold-resistant material; or (2) employs mold-resistant sealant.

15. The vertical wind tunnel of claim 8, wherein the plurality of diffusers comprises a first diffuser having a circle to quadrilateral transition and a second diffuser positioned between said first expanding corner and said second expanding corner.

16. The vertical wind tunnel of claim 15, wherein said return is positioned between the second expanding corner and the third expanding corner and transitions from a first quadrilateral cross section to a second quadrilateral cross section.

17. The vertical wind tunnel of claim 8, wherein air traveling through the vertical wind tunnel is cooled using a water cooling technique whereby water is brought into intimated contact with an exterior wall of said vertical wind tunnel.

18. The vertical wind tunnel of claim 8, wherein at least one of said plurality of expanding corners comprises a plurality of internally-cooled internal turning vanes.

19. The vertical wind tunnel of claim 18, wherein said internally-cooled internal turning vanes cooled via a ground-coupled heat exchanger.

20. The vertical wind tunnel of claim 8, wherein the flight chamber is fabricated from one or more transparent panels to permit an unrestricted view of activities taking place in the flight chamber.

21. The vertical wind tunnel of claim 6, further comprising a netting device positioned at an upstream end of said flight chamber, the netting device being coupled to a net frame via at least one cable, each of said at least one cable having a first distal end and a second distal end,
   wherein a head end unit is coupled to the first distal end and a receiving end unit is coupled to the second distal end,
   wherein the head end unit couples the first distal end to a first connection point on said net frame and comprises a first compression spring and a tensioning bolt that is adjustable in length, and
   wherein the receiving end unit couples the second distal end to a second connection point on said net frame and comprises a second compression spring.

22. A skydiving simulator, the skydiving simulator comprising:
   a fan operatively coupled with a motor; and
   a recirculating wind tunnel having a flight chamber, a plurality of diffusers, a plurality of expanding corners, and a return,
   wherein the plurality of expanding corners comprises a first expanding corner and a second expanding corner, each of said first expanding corner and said second expanding corner comprising an inlet having an inlet cross sectional area defining an inlet plane and an outlet having an outlet cross sectional area defining an outlet plane, the inlet plane being substantially perpendicular to the outlet plane, wherein the ratio of the inlet cross sectional area to the outlet cross sectional area defines an expansion ratio that is between about 1.01 to about 3.00,
   wherein the flight chamber is capable of floating at least one human housed within the flight chamber, and
   wherein the return is configured to have disposed therein the fan.

23. The vertical wind tunnel of claim 22, wherein the expansion ratio of at least one of said plurality of expanding corners is between 1.10 and 1.50.

24. The vertical wind tunnel of claim 23, wherein the flight chamber is fabricated from one or more transparent panels to permit an unrestricted view of activities taking place in the flight chamber.

25. The vertical wind tunnel of claim 22, further comprising a netting device positioned at an upstream end of said flight chamber, the netting device being coupled to a net frame via at least one cable, each of said at least one cable having a first distal end and a second distal end,
  wherein a head end unit is coupled to the first distal end and a receiving end unit is coupled to the second distal end,
  wherein the head end unit couples the first distal end to a first connection point on said net frame and comprises a first compression spring and a tensioning bolt that is adjustable in length, and
  wherein the receiving end unit couples the second distal end to a second connection point on said net frame and comprises a second compression spring.

* * * * *